(12) United States Patent
Featonby et al.

(10) Patent No.: US 10,692,168 B1
(45) Date of Patent: Jun. 23, 2020

(54) AVAILABILITY MODES FOR VIRTUALIZED GRAPHICS PROCESSING

(71) Applicant: Amazon Technologies, Inc., Seattle, WA (US)

(72) Inventors: Malcolm Featonby, Sammamish, WA (US); Yuxuan Liu, Seattle, WA (US); Mihir Sadruddin Surani, Seattle, WA (US); John Merrill Phillips, Jr., Seattle, WA (US); Umesh Chandani, Seattle, WA (US); Douglas Cotton Kurtz, Sammamish, WA (US); Nicholas Patrick Wilt, Mercer Island, WA (US); Adithya Bhat, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 107 days.

(21) Appl. No.: 15/417,064

(22) Filed: Jan. 26, 2017

(51) Int. Cl.
| | |
|---|---|
| *G06T 1/20* | (2006.01) |
| *G06F 9/445* | (2018.01) |
| *G06F 9/455* | (2018.01) |
| *H04L 12/823* | (2013.01) |
| *H04L 12/753* | (2013.01) |
| *G06T 1/60* | (2006.01) |

(52) U.S. Cl.
CPC ............ *G06T 1/20* (2013.01); *G06F 9/45529* (2013.01); *H04L 45/48* (2013.01); *H04L 47/32* (2013.01); *G06T 1/60* (2013.01)

(58) Field of Classification Search
None
See application file for complete search history.

(56) References Cited

U.S. PATENT DOCUMENTS

| | | | |
|---|---|---|---|
| 9,069,622 B2 | 6/2015 | Post et al. | |
| 9,098,323 B2 | 8/2015 | Mitra et al. | |
| 2007/0033156 A1 | 2/2007 | Limpert et al. | |
| 2011/0083131 A1 | 4/2011 | Pirzada et al. | |
| 2011/0102443 A1 | 5/2011 | Dror et al. | |
| 2011/0134111 A1 | 6/2011 | Stone | |
| 2011/0182422 A1 | 7/2011 | Anderson et al. | |
| 2012/0069032 A1 | 3/2012 | Hansson et al. | |
| 2012/0154389 A1 | 6/2012 | Bohan et al. | |

(Continued)

FOREIGN PATENT DOCUMENTS

WO 2014100558 6/2014

OTHER PUBLICATIONS

U.S. Appl. No. 15/249,150, filed Aug. 26, 2016, Ingegneri.

(Continued)

*Primary Examiner* — Tize Ma
(74) *Attorney, Agent, or Firm* — Robert C. Kowert; Kowert, Hood, Munyon, Rankin & Goetzel, P.C.

(57) ABSTRACT

A first remote virtualized graphics device is instantiated in response to a determination that processing of graphics operations is to be enabled in a first availability mode on behalf of a compute instance. A configuration operation is performed at a routing device to enable packets from the first remote virtualized graphics device to be transmitted to a graphics result destination. In response to an indication of unavailability, the routing device is configured to enable packets from a second remote virtualized graphics device to be directed to the graphics result destination.

22 Claims, 12 Drawing Sheets

(56) References Cited

U.S. PATENT DOCUMENTS

| | | |
|---|---|---|
| 2014/0055466 A1 | 2/2014 | Petrov et al. |
| 2014/0169471 A1 | 6/2014 | He |
| 2014/0176583 A1 | 6/2014 | Abiezzi et al. |
| 2014/0181806 A1 | 6/2014 | Abiezzi et al. |
| 2014/0215462 A1 | 7/2014 | Kuo et al. |
| 2014/0286390 A1 | 9/2014 | Fear |
| 2015/0067672 A1 | 3/2015 | Mitra et al. |
| 2015/0097844 A1 | 4/2015 | Wankhede et al. |
| 2015/0105148 A1 | 4/2015 | Consul et al. |
| 2015/0116335 A1 | 4/2015 | Chen et al. |
| 2015/0220354 A1 | 8/2015 | Nair |
| 2015/0221063 A1 | 8/2015 | Kim et al. |
| 2015/0370589 A1 | 12/2015 | Bidarkar et al. |
| 2015/0370620 A1 | 12/2015 | Lai et al. |
| 2016/0100330 A1* | 4/2016 | Broustis ............ G06F 9/45558 370/237 |
| 2016/0234186 A1* | 8/2016 | Leblond ................ G06Q 10/06 |
| 2016/0239333 A1 | 8/2016 | Cowperthwaite et al. |
| 2016/0247248 A1 | 8/2016 | Ha et al. |

OTHER PUBLICATIONS

U.S. Appl. No. 15/439,751, filed Feb. 22, 2017, Surani, et al.

Jeff Weiss, et al., "NVIDIA Grid VCPU Deployment Guide for VMWARE Horizon 6.1", NVIDIA TechPub, Mar. 1, 2015, Retrieved from URL: http://www.vmware.com/content/dam/digitalmarketing/vmware/en/pdf/products/horizon/grid-vgpu-deployement-guide.pdf, pp. 1-14.

Shinpei Kato, et al., "Gdev: First-Class GPU Resource Management in the Operating System", Jun. 1, 2012, Retrieved from URL: https://www.usenix.org/system/files/conference/atc12/atc12-final1319.pdf, pp. 1-12.

Mark Panahi, et al., "A Framework for Real-Time Service-Oriented Architecture", 2009 IEEE Conference on Commerce and Enterprise Computing (CED '09), Jul. 20, 2009, pp. 460-467.

Matthew Danish, et al., "Virtual-CPU Scheduling in the Quest Operating System", 2011 17th IEEE Real-Time and Embedded Technology and Application Symposium, Apr. 11, 2011, pp. 169-179.

Marcos D. Assuncao, et al., "CloudAthnity: A Framework for Matching Servers to Cloudmates", 2012 IEEE Network Operations and Management Symposium (NOMS 2012), Apr. 16-20, 2012, pp. 213-220.

Lin Shi, et al., "vCUDA: GPU-Accelerated High-Performance Computing in Virtual Machines", IEEE Transaction on Computers, vol. 61, No. 6, Jun. 2012, pp. 804-816.

Installing VMware VGPU on vSphere 6.0, Martijin Smit, Mar. 7, 2015, pp. 1-10.

U.S. Appl. No. 15/374,509, filed Dec. 9, 2016, Malcolm Featonby et al.

U.S. Appl. No. 14/822,511, filed Aug. 10, 2015. Nicholas Patrick Wilt et al.

U.S. Appl. No. 14/938,457, filed Nov. 11, 2015, Nicholas Patrick Wilt et al.

U.S. Appl. No. 14/938,461, filed Nov. 11, 2015, Nicholas Patrick Wilt et al.

U.S. Appl. No. 14/938,656, filed Nov. 11, 2015, Nicholas Patrick Wilt et al.

U.S. Appl. No. 14/938,654, filed Nov. 11, 2015, Nicholas Patrick Wilt et al.

U.S. Appl. No. 15/178,292, filed Jun. 9, 2016, Nicholas Patrick Wilt.

U.S. Appl. No. 15/177,255, filed Jun. 8, 2016, Nicholas Patrick Wilt.

U.S. Appl. No. 15/177,262, filed Jun. 8, 2016, Nicholas Patrick Wilt.

Nice, "DCV Administration Guide," Nice s.r.l, Asti, Italy, Jul. 2015, Source: https://www.nice-software.com/download/nice-dcv-2014#documentation, pp. 1-96.

Federico Silla. "The rCUDA technology: an inexpensive way to improve the performance of GPU-based clusters." Talk at Computer Engineering Laboratory, Delft University of Technology. Delft, Netherlands. Apr. 2015, pp. 1-47.

Antonio J. Pena, et al., "A Complete and Efficient CUDA-Sharing Solution for HPC Clusters", Sep. 2, 2014, Retrieved from the Internet: URL: http://www.mcs.anl.gov/papers/P5137-0514.pdf, pp. 1-28.

U.S. Appl. No. 15/470,821, filed Mar. 27, 2017, Malcolm Featonby, et al.

* cited by examiner

D. Migration step 2: copy state

E. Migration step 3: routing change info sent by VGCS control plane

F. Migration step 4: connectivity to migration target established; migration complete

AVAILABILITY MODES FOR VIRTUALIZED GRAPHICS PROCESSING

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

The advent of virtualization technologies for commodity hardware has provided benefits with respect to managing large-scale computing resources for many clients with diverse needs. For example, virtualization technologies may allow a single physical computing device to be shared among multiple users by providing each user with one or more virtual machines hosted by the single physical computing device. Each such virtual machine may be a software simulation acting as a distinct logical computing system that provides users with the illusion that they are the sole operators and administrators of a given hardware computing resource, while also providing application isolation and security among the various virtual machines. With virtualization, the single physical computing device can create, maintain, or delete virtual machines in a dynamic manner. For some applications implemented using virtual machines, specialized processing devices may be appropriate for some of the computations performed—e.g., some algorithms may require extensive manipulation of graphical data.

Figure 1:
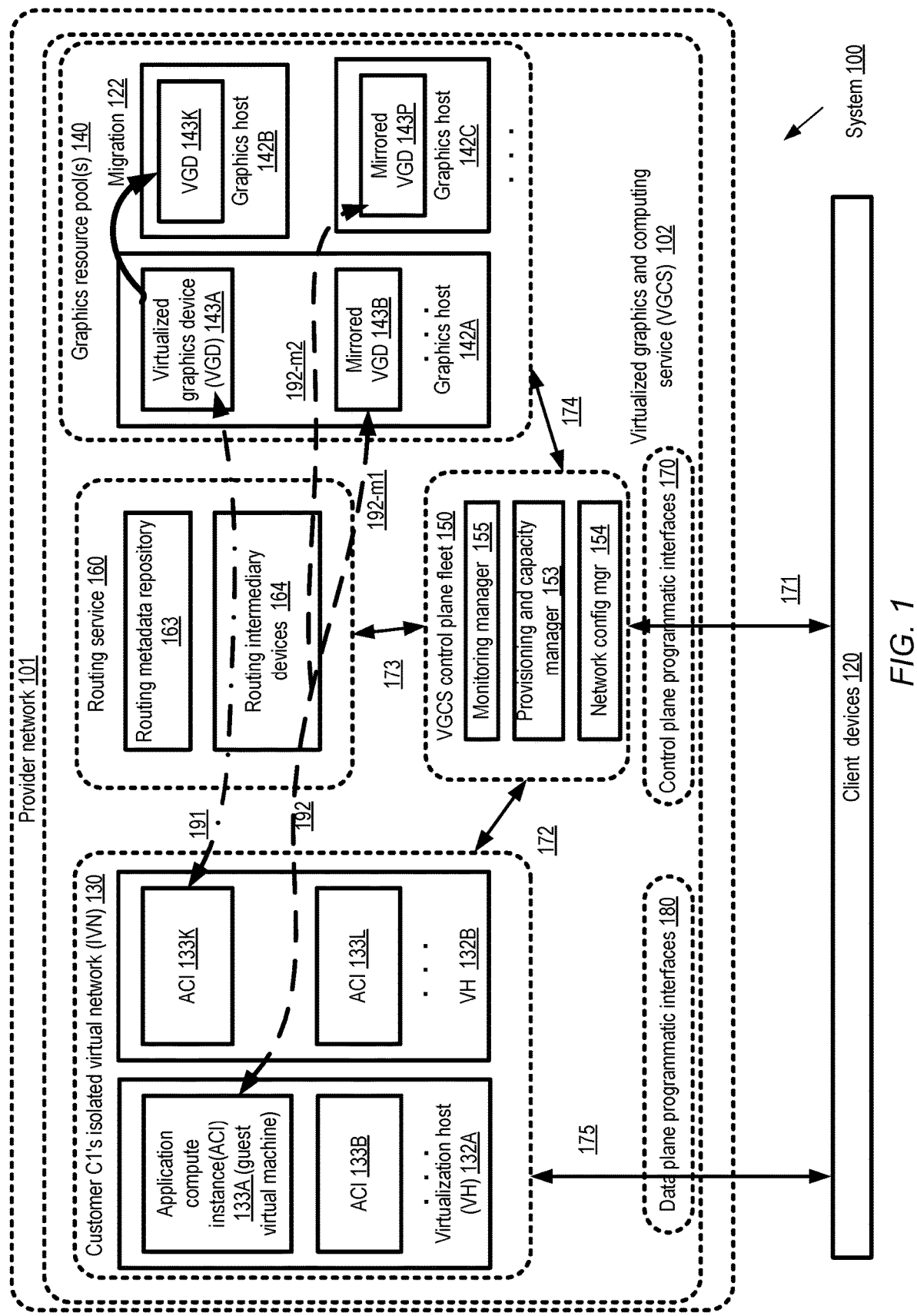
FIG. 1 illustrates an example system environment for virtualizing graphics processing in a provider network, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for supporting a variety of availability modes for remote virtualized graphics devices accessible to applications via a network are described. According to one embodiment, a network-accessible virtualized graphics and computing service (VGCS) may implement programmatic interfaces enabling clients to request allocation and instantiation of guest virtual machines which can be used to execute applications. Such guest virtual machines may also be referred to as "application compute instances" in various embodiments. Some of the applications of the clients may include substantial amounts of graphics-related processing—e.g., for game streaming, 3D application streaming, scientific visualizations/simulations, server-side graphics workloads, rendering, financial modeling, and/or engineering design tasks. To serve clients with such applications, in various embodiments the VGCS may configure remote virtualized graphics devices (such as virtual graphics processing units) which are available for network access from application compute instances. In such embodiments, after network connectivity has been enabled between an application compute instance and a remote virtualized graphics device instantiated on a hardware platform that comprises processors optimized for graphics processing (such as various types of physical graphical processing units or GPUs), at least some portions of the graphics-related processing of some client applications may be performed using the virtualized graphics devices and the optimized processors. In one embodiment, for example, a client may choose a virtualized graphics device type from several supported classes of virtualized graphics devices, and submit a request to "attach" an instance of the selected virtualized graphics device type to a particular application compute instance, or to instantiate a new application compute instance which has a selected type of virtualized graphics device attached. In response to such a request, the control plane of the VGCS may enable network access between the application compute instance and the virtualized graphics device in various embodiments.

In at least one embodiment, a remote virtualized graphics device may be configured for use by an application compute instance in one of several availability modes supported by the VGCS. Generally speaking, in various embodiments the availability modes selected may influence the extent to which graphics applications being executed using the virtualized graphics devices are likely to be affected or impacted by maintenance operations, device failures or networking failures. In at least some embodiments, the billing costs associated with the use of one availability mode may differ from the billing costs associated with the use of a different availability mode. Some availability modes, such as the mirrored mode discussed below in further detail, may be designed to ensure that single failures of graphics devices typically have no impact on customer applications. Other availability modes, such as the migrate-as-needed mode, which may be cheaper from the perspective of the clients on whose behalf the applications are being run, may in some rare circumstances cause small delays in graphics processing.

In various embodiments, in the mirrored availability mode, multiple virtualized graphics devices may perform the same set of graphics operations in response to a single request from the application compute instance (as suggested by the use of the term "mirrored"), and a result from one or more of the multiple virtualized graphics devices may be provided to the application compute instance or some other designated graphics result destination. In at least some embodiments, in the migrate-as-needed mode, a single non-mirrored virtualized graphics device may be configured for a given application compute instance. If and when evidence of unavailability of the non-mirrored virtualized graphics device is obtained by the VGCS control plane (e.g., based on notifications of scheduled maintenance or other potential outage-causing events, and/or based on monitoring of various VGCS components), a replacement virtualized graphics device may be instantiated in the migrate-as-needed mode. Information pertaining to the state of the graphics processing may be migrated from the initial virtualized graphics device to the replacement virtualized graphics device, and subsequent processing of graphics operations on behalf of the application compute instance may be performed at the replacement virtualized graphics device in at least some embodiments. In addition to or instead of the migrate-as-needed mode and/or the mirrored mode, a number of other availability modes may be supported for remote virtualized graphics processing in some embodiments, including for example a hybrid mode discussed in further detail below which incorporates features of both the migrate-as-needed mode and the mirrored mode.

The particular availability mode used for an application compute instance's remote virtualized graphics processing may be selected, e.g., either by the client on whose behalf the application compute instance is established, or by the VGCS control plane in various embodiments. The selection may be based on any combination of one or more factors in some embodiments, such as the maximum acceptable downtime for the graphics applications being run, billing rates associated with the different modes, a default availability mode defined at the VGCS, and so on.

According to one embodiment, in response to a determination that processing of remote virtualized graphics operations in a migrate-as-needed availability mode on behalf of a first application compute instance is to be enabled, a VGCS control plane component such as a network configuration manager may instantiate a first remote virtualized graphics at a first graphics host. The first remote virtualized graphics device may be configured to execute at least a portion of a graphics operation requested by the first application compute instance. The VGCS control plane may cause configuration operations at one or more routing devices to enable packets to flow in both directions between the application compute instance and the first remote virtualized graphics device. Packets containing requests for graphics operations may be directed from the application compute instance to the first remote virtualized graphics device as a result of the routing-related configuration operations, for example. Similarly, the routing configuration operations may result in packets containing results of graphics operations performed at the first remote virtualized graphics device to be directed to the first application compute instance.

In some embodiments, in the migrate-as-needed mode, in response to at least some types of indications of unavailability of the first remote virtualized graphics device, the VGCS control plane may take responsive actions to migrate the graphics processing being performed on behalf of the first application compute instance to a second remote virtualized graphics device. For example, the VGCS control plane may provision the resources needed to launch or instantiate a second remote virtualized graphics device at a second host, and cause at least a portion of the state information of the graphics application which was being run at the first remote virtualized graphics device, to be stored at or migrated to the second remote virtualized graphics device. The state information may comprise, for example, at least a portion of contents of one or more hardware and/or software caches to be copied from the first host to the second host. Routing configuration operations which enable the flow of graphics-related traffic in both directions between the first application compute instance and the second remote virtualized graphics device may be initiated by the networking configuration manager or other components of the VGCS control plane. The indications of unavailability of the first remote virtualized graphics device which lead to the configuration of the replacement virtualized graphics device may pertain to planned or scheduled events such as maintenance of the graphics hosts, switches (e.g., top-of-rack switches), and/or other equipment, upgrades of software at the graphics hosts, and so on in some embodiments. In at least one embodiment, the indications of unavailability may be obtained after a failure event—e.g., as a result of monitoring state and connectivity information of various components of the VGCS and associated infrastructure as discussed below. Thus, in some cases the migration of the graphics workload to a replacement device may be performed in advance of a possible period of unavailability, while in other cases the migration may be performed after the initially-configured graphics device becomes unavailable (or appears to become unavailable).

In various embodiments, the provisioning and launching of the replacement virtualized graphics device and the copying of the state information may be completed fairly quickly, resulting in zero or negligible delay in the rendering of the results of the graphics operations from a customer perspective. However, in some cases, there may be a brief delay in rendering some of the results of graphics processing when the migrate-as-needed mode is employed. For customers who wish to reduce the probability of such delays for their applications, the mirrored availability mode may be supported in at least some embodiments.

According to some embodiments, a networking configuration manager or other component of the VGCS control plane may determine that processing of remote virtualized graphics operations in the mirrored availability mode on behalf of a particular application compute instance is to be enabled. The VGCS may then instantiate a plurality of remote virtualized graphics devices, which may be referred to as a set of mirrored remote virtualized graphics devices or simply as mirrors. In response to a single request for a given graphics operation from the particular application compute instance, each of the mirrors may be configured to perform a respective (duplicate) execution of the given graphics operation. Thus, for example, if a graphics operation Goper1 is requested, and two mirrored remote virtualized graphics devices VGD1 and VGD2 have been configured, Goper1 may be executed at VGD1, and Goper1 may also be executed at VGD2. Respective copies of the packets containing graphics requests may be sent to each of the mirrors in some embodiments. Each of the mirrors' executions of the requested graphics operations may produce the same result (e.g., some set of bits representing a rendering of a graphics object), which may be incorporated within one or more result packets.

In some embodiments, in order to ensure that the particular application compute instance receives exactly one set of result packets for a given graphics request, the VGCS control plane may cause the appropriate configuration operations at one or more routing devices. These operations may enable, from among a plurality of packets containing duplicated graphics results from the various mirrors, a selected packet to be directed to the particular application compute instance. In some embodiments, from among N duplicate result packets generated at N mirrors, one may be selected for transmission back to the application compute instance, and the remaining (N−1) duplicate packets may be discarded at the routing components. It is noted that because each of the mirrors responds to identical request streams, application state information may be automatically replicated at each of the mirrors in various embodiments, so migration of state information from one remote virtualized graphics device to another in the event of a failure may not be required. As long as at least one mirror remains operational, the unavailability of a given mirror may have no impact on the application compute instance, since at least one mirror would be expected to complete any requested graphics operations. In various embodiments, if and when a particular mirror fails or has to be taken offline for maintenance or other reasons, a replacement mirror may be instantiated by the VGCS control plane and state information may be copied to the replacement mirror (e.g., as a background or low-priority task) from one of the operational mirrors. In some embodiments, duplicate response packets from the respective mirrors may be delivered to the application compute instances, e.g., instead of using the approach in which all but one of the duplicated response packets is discarded at routing components of the system. A de-duplication module at the application compute instance may be responsible for recognizing a set of duplicated packets representing the results of identical graphics processing at respective mirrors, and ensuring (e.g., by deleting all but one packet of the duplicated set) that the duplication has no negative effects on the application on whose behalf the corresponding graphics operation was requested. In one implementation, a respective token (such as a sequence number) or tag may be attached to or included within each request sent from the application compute instance. In the response packets generated at the remote virtualized graphics devices, the same tag may be included, making the task of recognizing duplicate response packets simpler. For example, if the request packet for a given graphics operation includes a tag "GRSN-100567" (where the "GRSN" represents "graphics request sequence number"), the response packets generated for that operation may also include "GRSN-100567" (optionally concatenated with a mirror identifier string), and the de-duplicator at the application compute instance may identify the duplicated set of response packets using the tag.

In one embodiment, instead of or in addition to being used to support a desired level of high availability, mirroring of remote virtualized graphics devices may be used for other purposes, such as for verifying that a new or under-test version of the software or hardware being used for remote virtualized graphics processing is functioning as desired. For example, one mirror MV1 may be set up to use a trusted or production version of a remote virtualized graphics device known to functioning correctly, and another mirror MV2 may utilize a new or experimental version of at least some portion of the hardware/software stack. As in the case of mirrored availability mode operations discussed above, each of the mirrors may execute the same set of operations, and generate respective sequences of response packets, with tags being included in each response packet to indicate whether the packet was generated at the trusted mirror MV1 or the experimental mirror MV2. In one such embodiment, both sets of response packets may be transmitted to the application compute instance at which the corresponding request was generated. A verification module at the application compute instance may compare the results obtained from the two mirrors in such an embodiment, and check whether the responses generated by the experimental mirror MV2 meet acceptance criteria relative to the responses generated by the trusted mirror MV1. The acceptance criteria could require, for example, the responses to be identical in some cases. In other cases, the responses need not be identical, but an analysis which confirms that the results from MV2 are "no worse than" the results from MV1 may be required, where the semantics of the comparison may vary depending on the type of graphics operation performed. Such functional comparisons between versions may be performed independently of the availability mode being used in at least some embodiments—e.g., mirroring for version comparison may be performed regardless of whether the migrate-as-needed availability mode, the mirrored availability mode, or some other availability mode is in use.

In some embodiments, a hybrid availability mode which incorporates aspects of both the migrate-as-needed mode and the mirrored mode may be supported. For example, in one such embodiment, a single remote virtualized graphics device may be set up initially in the hybrid mode for a given application compute instance, as in the migrate-as-needed mode. If certain types of triggering conditions are detected in such an embodiment, the VGCS control plane may configure one or more mirrored remote virtualized graphics devices and temporarily transition to the mirrored availability mode. The transition may involve copying state information to the mirrors, which may be done without interrupting or impacting ongoing operations at the initially-configured remote virtualized graphics device. If needed, the reverse transition may be performed in response to other triggering conditions in some embodiments—e.g., migrate-as-needed mode may be re-activated by shutting down or terminating all but one of the mirrors. Availability modes may be changed dynamically in some embodiments, e.g., in response to requests received from clients at the VGCS.

In some embodiments, a replacement virtualized graphics device for an initially-configured virtualized graphics device in the migrate-as-needed mode may not necessarily be instantiated at a different graphics host than the graphics host used for the initially-configured virtualized graphics device. Similarly, in at least one embodiment, when the mirrored mode is used, a single graphics host may be used for multiple mirrors—that is, a different graphics host may not be required for each mirror. In other embodiments, different hosts may be utilized for the initially-configured and replacement virtualized graphics devices in the migrate-as-needed mode, and different hosts may be used for each mirror established in the mirrored mode.

In some embodiments, respective isolated virtual networks (IVNs) may be established on behalf of various clients at the VGCS. An isolated virtual network may comprise a collection of networked resources (including, for example, application compute instances) allocated to a given client, which are logically isolated from (and by default, inaccessible from) resources allocated for other clients in other isolated virtual networks. The client on whose behalf an IVN is established may be granted substantial flexibility regarding network configuration for the resources of the IVN—e.g., private IP addresses for application compute instances may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on. Isolated virtual networks may be used by the control plane or administrative components of the VGCS itself for various purposes in some embodiments—e.g., in one embodiment, a set of virtualized graphics devices may be configured within an IVN. In at least some embodiments, a VGCS may be implemented at a provider network. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network (and/or a VGCS) may in some cases be distributed across multiple data centers, which in turn may be distributed among numerous geographical regions (e.g., with each region corresponding to one or more cities, states or countries).

The operation of configuring a remote virtualized graphics device for network access from an application compute instance may be referred to as "attaching" the remote virtualized graphics device to the application compute instance in some embodiments. In embodiments in which the application compute instance is part of an IVN, one or more network addresses (e.g., IP version 4 or IP version 6 addresses) within the IVN may be identified as source addresses for graphics virtualization-related traffic originating at the application compute instance. In such embodiments, the graphics virtualization-related traffic may comprise, for example, requests for execution of graphics operations (which may be transmitted at any of several layers of a software stack from the application compute instance to the remote virtualized graphics device) and responses to such requests. For example, in one embodiment, a virtual network interface with an IP address IPAddr1 may be configured within the IVN for graphics-related traffic associated with one or more application compute instances. In such an embodiment, network packets comprising graphics processing requests may be transmitted from the application compute instance to a remote virtualized graphics device using IPAddr1 as a source address, and responses from the remote virtualized graphics devices may be directed to IPAddr1. Virtual network interfaces may also be referred to as elastic network interfaces in some embodiments. The terms "graphics-related traffic", "graphics-processing related traffic", and "graphics virtualization-related traffic" may be used interchangeably with respect to at least some embodiments.

In at least one embodiment, the VGCS may identify a source network address of a particular virtual network interface configured for graphics-related traffic of the isolated virtual network of an application compute instance. A particular source port number which is to be associated with the application compute instance may be identified in some embodiments. For example, in some embodiments a source port number which is currently unused (in the context of the first source network address) may be identified using an atomic update operation on a bit map or similar data structure which represents a range of source port numbers associated with the source network address. The control plane component may generate routing metadata indicating that a persistent key is to be used to identify a route for a plurality of network packets between the application compute instance and a selected virtualized graphics device (or multiple virtualized graphics devices if the mirrored availability mode is being implemented) in some embodiments. The persistent key may, for example, be based at least in part on the particular source network address and the source port number identified. The routing metadata may be propagated to the appropriate intermediary networking devices, such as various routers of a routing service used at the VGCS in various embodiments. Subsequently, in at least some embodiments the routing metadata may be used at the intermediary networking devices to route packets comprising graphics processing requests originating at the application compute instance, and the packets comprising responses to such requests. In effect, a mapping between a unique (source network address, source port) combination, a particular application compute instance, and one or more remote virtualized graphics devices (depending on the availability mode) may be generated and made persistent (e.g., by storing the routing metadata in one or more persistent control plane databases) in some embodiments.

Any of a variety of networking protocols may be used for the graphics related traffic in different embodiments. For example, a Transmission Control Protocol (TCP) connection may be established between the application compute instance and one or more remote virtualized graphics devices (depending on the availability mode being employed) in some embodiments. Other protocols may be used in other embodiments. Information about the mappings between the application compute instance, the source IP address and source port associated with the application compute instance, and the remote virtualized graphics device(s) may be transmitted from the VGCS control plane to the endpoints involved (as well the networking intermediaries) involved in at least some embodiments—e.g., to the application compute instance, and to the remote virtualized graphics device(s).

Example System Environment

FIG. 1 illustrates an example system environment for virtualizing graphics processing in a provider network, according to one embodiment. As shown, system 100 comprises a provider network 101 in which a virtualized graphics and computing service (VGCS) 102 is implemented. The VGCS 102 may include, among other resources, a control plane fleet 150, one or more isolated virtual networks (IVNs) such as IVN 130 established on behalf of respective clients or customers of the VGCS, one or more graphics resource pools 140, and a routing service 160 in the depicted embodiment. The VGCS may implement a number of programmatic interfaces in the depicted embodiment, including control plane programmatic interfaces 170 and data plane programmatic interfaces 180. The control plane programmatic interfaces 170 may be used, for example, to transmit administrative requests from client devices 120 to the VGCS as indicated by arrow 171, such as requests to instantiate or launch application compute instances 133 with or without attached remote virtualized graphics devices 143 in various availability modes, to pause or terminate the application compute instances, to attach or detach remote virtualized graphics devices from application compute instances, to switch the configuration of one or more application compute instances and virtualized graphics devices from one availability mode to another, to view monitoring information, and so on. The data plane programmatic interfaces 180 may be used from client devices to access allocated application compute instances 133 as indicated by arrow 175, e.g., to initiate/terminate various applications, inspect application data, and so on. Any of a variety of interfaces may be used for the control plane and/or data plane interactions between the clients and the VGCS in different embodiments, such as web-based consoles, application programming interfaces (APIs), command line tools, graphical user interfaces and the like. A client device 120 may, for example, comprise any computing device (such as a laptop or desktop computer, a tablet computer, a smart phone or the like) from which such interfaces may be utilized or invoked in various embodiments.

In the depicted embodiment, IVN 130 has been established for a particular customer C1, and comprises at least four application compute instances 133A, 133B, 133K and 133D. Each of the application compute instances may comprises a respective guest virtual machine running on a virtualization host 132. For example, virtualization host 132A comprises application compute instances 133A and 133B, while virtualization host 132B comprises application compute instances 133K and 133L. At the client's request, one or more remote virtualized graphics devices 143 (e.g., virtual GPUs) may be attached to a given application compute instance 133 in a particular availability mode. A number of different availability modes for remote virtualized graphics processing may be supported in the depicted example. The availability mode selected for a given application compute instance's remote graphics operations may depend on various factors in different embodiments, such as the extent to which the application being executed on behalf of the compute instance can withstand minor delays which may result from potential failures or maintenance events and the like.

Arrows 191 and 122 collectively illustrate a use of a migrate-as-needed availability mode with respect to remote virtualized graphics device 143A of graphics host 142A and application compute instance 133K in the depicted embodiment. Initially, remote virtualized graphics device 142A is configured for application compute instance 133K, as indicated by arrow 191. The appropriate routing metadata or mappings may be provided to the routing service 160 by the network configuration manager 154 of the VGCS control plane to enable packets containing graphics requests from application compute instance 133K to be directed via routing intermediary devices 164 to remote virtualized graphics device 142A, and packets containing responses to the graphics requests to be directed from device 142A back to the application compute instance 133K. If and when information indicating possible or actual unavailability of virtualized graphics device 143A is obtained by the VGCS control plane, the graphics workload being executed at device 143A on behalf of application compute instance 133K may be migrated to a replacement virtualized graphics device 143K, as indicated by the arrow labeled "Migration 122". The migration procedure may involve various steps as discussed below in the context of FIG. 3 and FIG. 4, such as copying of state information from the initial virtualized graphics device 143A to a newly-provisioned or newly-instantiated replacement virtualized graphics device 143K at a different host 142B (which may in turn require temporary network isolation of the initial virtualized graphics device 143A), and the generation and propagation of the new routing metadata/mappings to enable graphics-related traffic to flow between the application compute instance 133A and the replacement virtualized graphics device 143K.

In contrast to application compute instance 133K, the remote processing of graphics operations on behalf of application compute instance 133A is set up in mirrored availability mode in the depicted embodiment. Instead of establishing just one remote virtualized graphics device, a pair of mirrored virtualized graphics devices 143B (at graphics host 142A) and 143P (at graphics host 142C) which operate concurrently have been instantiated for application compute instance 133A. The network configuration manager 154 may cause configuration changes at the routing service (e.g., by generating the appropriate routing mappings and/or directives) to enable replicas or copies of each packet containing graphics requests from application compute instance 133A to be sent to both mirrored virtualized graphics devices (as indicated by the arrows 192-$m1$ and 192-$m2$ associated with arrow 192 from the application compute instance). Each of the mirrored virtualized graphics devices 143B and 143P may respond to a given graphics request by executing the requested operation in the depicted embodiment—that is, the same operation may be performed twice, once at device 143B and once at device 143P. In at least some embodiments, the duplicate executions may complete at slightly different times at the two mirrors—that is, synchronization between the operations performed at the mirrors may not be required. One set of packets containing results of such an execution may be generated at device 143B and directed towards the requesting application compute instance 133A, and another set of packets (a duplicate of the first set) containing results may be generated at device 143P and also directed towards the requesting application compute instance 133A. The network configuration manager 154 may cause configuration operations at the routing service that result in only one result packet (from among a pair of duplicated packets, one of which was generated at each mirror) to be transmitted on to the application compute instance 133A in at least some embodiments.

In one such embodiment, the second (duplicate) result packet, i.e., the one which is not forwarded to the requesting application compute instance, may be discarded in accordance with the routing configuration operation initiated at the VGCS control plane. In another embodiment, a component at the application compute instance 133A may be responsible for recognizing duplicated result packets, and ignoring one of the duplicated pair. That is, the routing intermediary devices 164 may forward both packets with identical result contents on to the requesting application compute instance in such an embodiment. In some embodiments, the results of the graphics operations performed at the remote virtualized graphics devices 143 may be transmitted directly to a client device 120, e.g., instead of first being provided to the requesting application compute instance and then being sent to the client device 120 by the application compute instance. Routing-related configuration operations may be initiated by the VGCS to enable the packets containing the results to be directed to the appropriate destination in various embodiments, regardless of whether the graphics result destination is the requesting application compute instance 133 or a client device 120. In at least one embodiment, availability modes other than migrate-as-needed or mirrored mode may be supported by a VGCS 102—e.g., a hybrid mode which incorporates aspects of both the mirrored mode and the migrate-as-needed mode may be supported as described below, and/or a mode in which no action is taken when/if a remote virtualized graphics device becomes unavailable may be supported.

In some cases, a client may submit a control plane request via an interface 170 indicating that an application compute instance 133 of a particular class or type, with an attached remote virtualized graphics device of a particular class or type, is to be instantiated using a selected availability mode in the depicted embodiment. In such a scenario, the VGCS control plane may enable the network connectivity between the application compute instance and a selected remote virtualized graphics device as part of the response to the instantiation request—that is, the application compute instance may be provided to the client with a remote virtualized graphics device(s) already attached in the appropriate availability mode. In other cases, a client may first obtain an application compute instance 133 which does not have a remote virtualized graphics device configured for it, and later request than a remote virtualized graphics device 143 be attached to the application compute instance in some selected availability mode. Clients may also request detachment of remote virtualized graphics devices as and when desired, or a change to the availability mode being used, via programmatic interfaces 170 in various embodiments. In at least one embodiment in which multiple availability modes are supported, a default mode may be used for a given application compute instance if no preference is indicated by a client.

Regardless of the availability mode selected for a given application compute instance, a provisioning and capacity manager component 153 of the VGCS control plane may be responsible for determining whether sufficient unused resources are available in the graphics resource pool(s) 140 for setting up the virtualized graphics devices needed to implement the availability mode in the depicted embodiment. A monitoring manager 155 in the VGCS control plane may be responsible in the depicted embodiment for collecting various metrics indicative of the connectivity between application compute instances 133 and the remote virtualized graphics devices 143 as well as the health status of the compute instances and the virtualized graphics devices themselves, as discussed below in further detail. The information collected by the monitoring manager 155 may be used, for example, to determine when a replacement virtualized graphics device such as 143K is to be configured in accordance with the availability mode being used for a given application compute instance.

In at least one embodiment, routing metadata including, for example, mappings between a source network address, a source port, an application compute instance, and the remote virtualized graphics device(s) to be used in a selected availability mode may be sent to the isolated virtual network (as indicated by arrow 172) and to the graphics resource pool 140 (as indicated by arrow 174), in addition to being sent to the routing service 160 (as indicated by arrow 173). At the routing service 160, the metadata may be stored in repository 163 in the depicted embodiment. In one embodiment, the mappings may be provided to one or more of the endpoint entities involved in the graphics traffic—the application compute instance 133 and the remote virtualized graphics device(s) 143 to which the application compute instance is connected for at least some time period. Using the mapping, the application compute instances and/or the remote virtualized graphics devices may be able to verify that graphics-related network packets or messages that they have received are from the appropriate authorized endpoints in various embodiments, thereby enhancing application security. In one embodiment, for example, prior to performing graphics processing operations indicated in a received request, a remote virtualized graphics device 143 may use the mapping to validate that the request originated at an acceptable or expected application compute instance. In another embodiment, before accepting results of graphics processing included in a received message, an application compute instance 133 may use the mapping to validate that the message originated at a virtualized graphics device to which the corresponding request was directed. If and when the graphics workload for a given application compute instance is migrated to a replacement virtualized graphics device, updated mappings may be provided to the application compute instance in various embodiments.

In one embodiment, the VGCS 102 may offer application compute instances 133 with varying computational and/or memory resources. In one embodiment, each of the application compute instances 133 may correspond to one of several instance types. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality of the VGCS 102, an instance type may be selected for a client, e.g., based (at least in part) on input from the client. For example, a client may choose an instance type from a predefined set of instance types. As another example, a client may specify the desired resources of an instance type, and the VGCS control plane may select an instance type based on such a specification.

In one embodiment, the VGCS 102 may offer virtualized graphics devices 143 with varying graphics processing capabilities. In one embodiment, each of the virtualized graphics devices 143 may correspond to one of several virtual GPU classes. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. Using instance type selection functionality of the VGCS, a virtual GPU class may be selected for a client, e.g., based (at least in part) on input from the client. For example, a client may choose a virtual GPU class from a predefined set of virtual GPU classes. As another example, a client may specify the desired resources of a virtual GPU class, and the instance type selection functionality may select a virtual GPU class based on such a specification.

In at least one embodiment, the resources of a given virtualization host and/or a given graphics host may be used in a multi-tenant fashion—e.g., application compute instances of more than one client may be established at a given virtualization host, or virtualized graphics devices for more than one client may be established at a given graphics host. In other embodiments, a single-tenant approach may be used with respect to at least some virtualization hosts and/or at least some graphics hosts—e.g., application compute instances of no more than one client may be instantiated on a given virtualization host, and virtualized graphics devices of no more than one client may be instantiated on a given graphics host.

Figure 2:
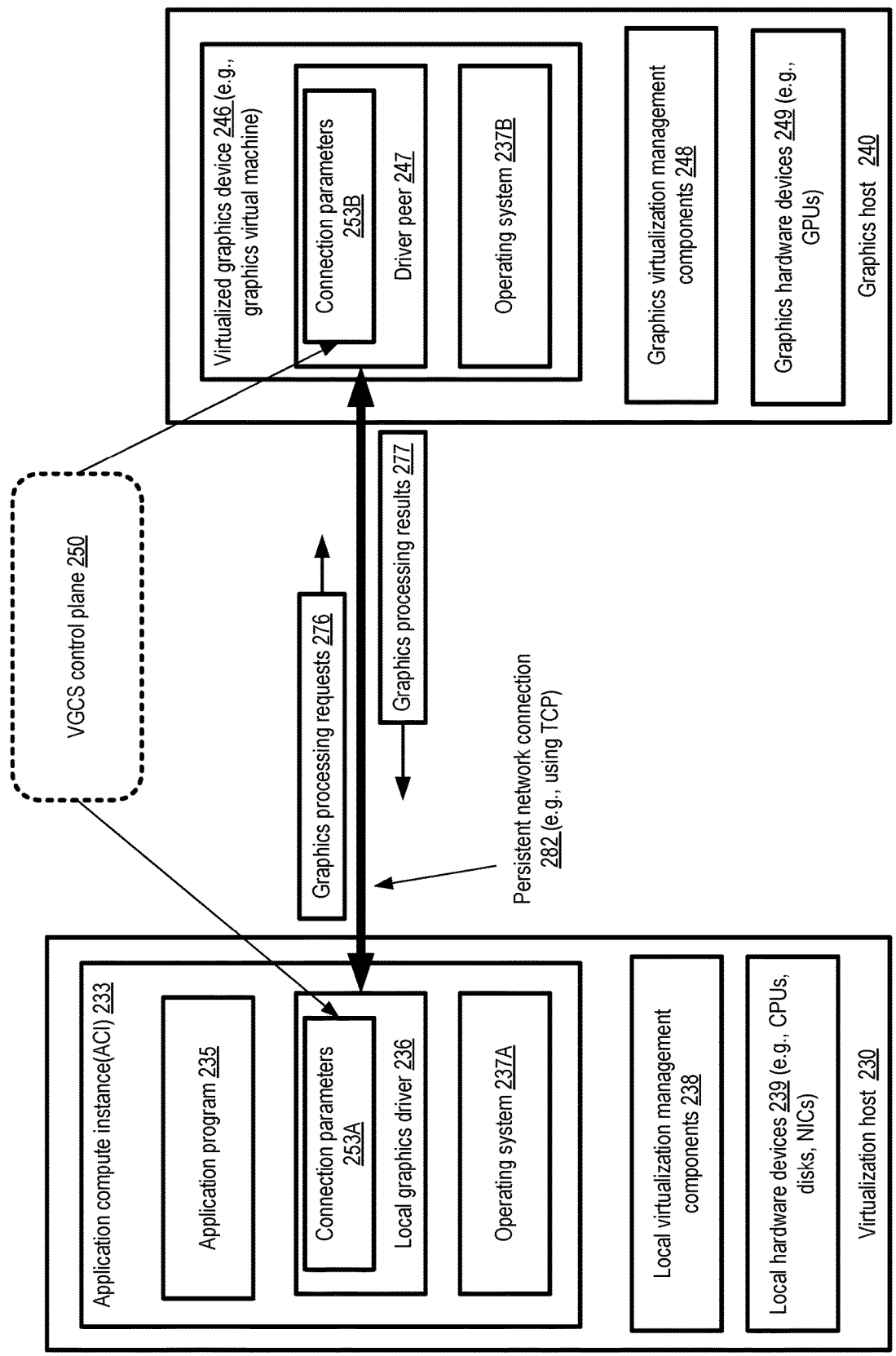
FIG. 2 illustrates example components of virtualization hosts and graphics hosts which may be used for virtualizing graphics processing, according to at least some embodiments.

FIG. 2 illustrates example components of virtualization hosts and graphics hosts which may be used for virtualizing graphics processing, according to at least some embodiments. As shown, a virtualization host 230 may comprise a set of local hardware devices 239, local virtualization management components 238, and one or more application compute instances 233 in the depicted embodiment. A graphics host 240 may comprise one or more graphic hardware devices 249 (e.g., including graphics processing units or GPUs), graphics virtualization management components 248, and one or more virtualized graphics devices 246 in the depicted embodiment. The respective virtualization management devices at the virtualization host and the graphics host may be responsible for handling interactions between the hardware devices and the virtual devices implemented at the respective hosts—e.g., the application compute instance(s) and the virtualized graphics device(s). At the virtualization host, for example, the virtualization management components may include a hypervisor, a privileged instance of an operating system, and/or one or more peripheral devices which may be used for handling networking-related virtualization tasks (such as translations between network addresses assigned to a physical Network Interface Card and network addresses of virtual network interfaces) in some embodiments. Analogous virtualization management components may be instantiated at the graphics host 240 in at least some embodiments.

In the depicted embodiment, an application compute instance 233 (e.g., a guest virtual machine instantiated at virtualization host 230) may comprise, among other constituent elements, an application program 235, an operating system 237A and a local graphics driver 236. A virtualized graphics device 246, which may also be referred to as a graphics virtual machine, may comprise an operating system 237B and a driver peer 247 which communicates with the local graphics driver 236 of the application compute instance 233. A persistent network connection 282 may be established (e.g., as part of a procedure to attach the virtualized graphics device 246 to the application compute instance 233 in a selected availability mode) between the local graphics driver 236 and the driver peer 247 in the depicted embodiment. In some embodiments, for example, TCP may be used for the connection. If the mirrored availability mode discussed above is being used, a respective persistent network connection may be set up for each mirror in at least some embodiments. Connection parameters 253A and 253B, such as the network addresses and ports (including a unique source port associated with the application compute instance) to be used for the connection at either endpoint, may be determined at the VGCS control plane 250 and transmitted to the virtualization host and the graphics host in some embodiments. Graphics processing requests 276 may be transmitted over the connection 282 from the local graphics driver 236 to driver peer 247 in the depicted embodiment. From the driver peer 247, corresponding local versions of the graphic processing requests may be transmitted to the graphics hardware devices 249, and the results 277 obtained from the graphics hardware devices 249 may be transmitted back to the virtualization host via connection 182. As mentioned earlier, in some embodiments in which the mirrored availability mode is being used, results from some of the mirrors may be discarded at intermediary routing components between the graphics host and the virtualization host. In other embodiments, duplicate result packets generated at the different mirrors may be sent to the application compute instance, and the local graphics driver 236 may eliminate duplicate packets as needed. The local graphics driver 236 may interact with the virtualized graphics device 246 to provide various types of graphics processing operations for application program 235 in the depicted embodiment, including accelerated two-dimensional graphics processing and/or accelerated three-dimensional graphics processing. In one embodiment, the local graphics driver 236 may implement a graphics application programming interface (API) such as Direct3D or OpenGL. In the depicted embodiment, the local graphics driver 236 may comprise components running in user mode and/or kernel mode. Additional components (not shown), such as a graphics runtime, may also be used to provide accelerated graphics processing on the application compute instance 233 in some embodiments.

The layers of the software/hardware stack at which a network connection is established and maintained between the virtualization host and the graphics host may differ in different embodiments. For example, in one embodiment, a process or thread in the operating system layer 237A of the application compute instance may establish a persistent network connection with a peer process or thread in the operating system layer 237B of the virtualized graphics device 246. In another embodiment, a respective persistent network connection may be established between the virtualization management components of the virtualization host and the graphics host(s) for individual application compute instances. In some embodiments, persistent connectivity for graphics-related traffic may be established at a layer that lies below the virtualization management components at each host, and above the respective hardware devices at each host.

Migrate-as-Needed Availability Mode

Figure 3:
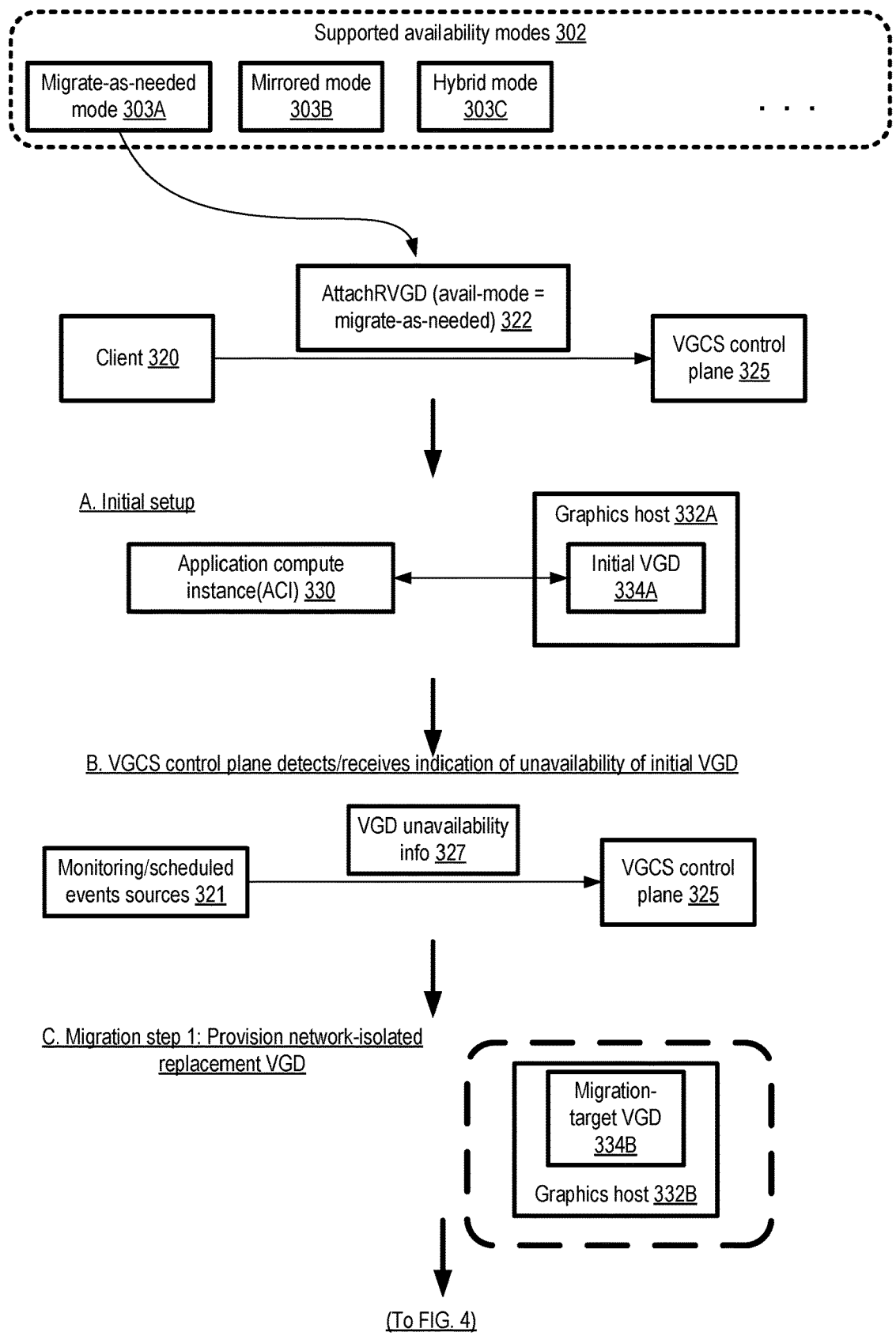
FIG. 3 and FIG. 4 collectively illustrate example operations which may be performed to implement a migrate-as-needed availability mode for virtualized graphics devices, according to at least some embodiments.
Figure 4:
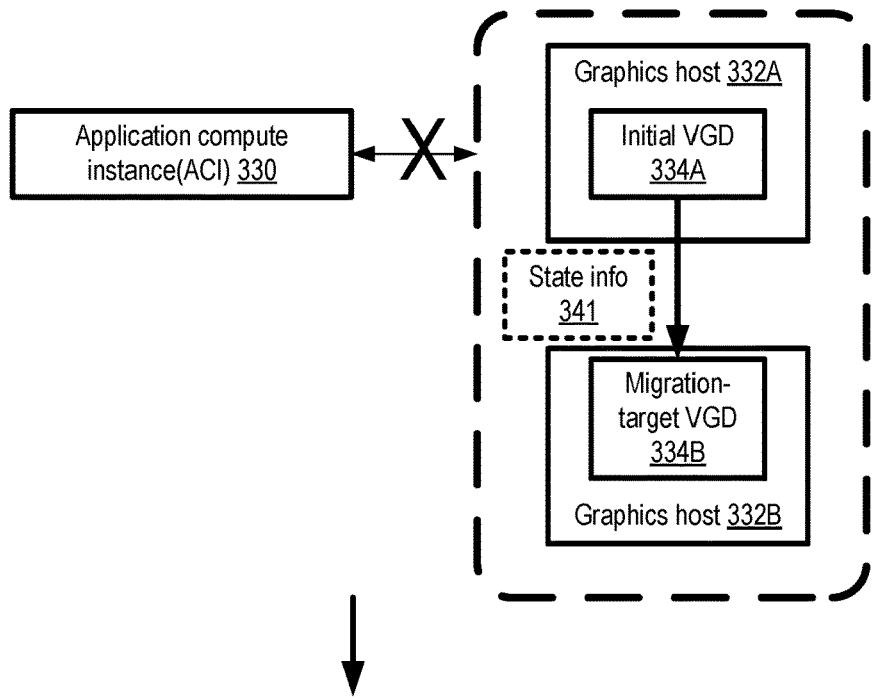
Figure 4:
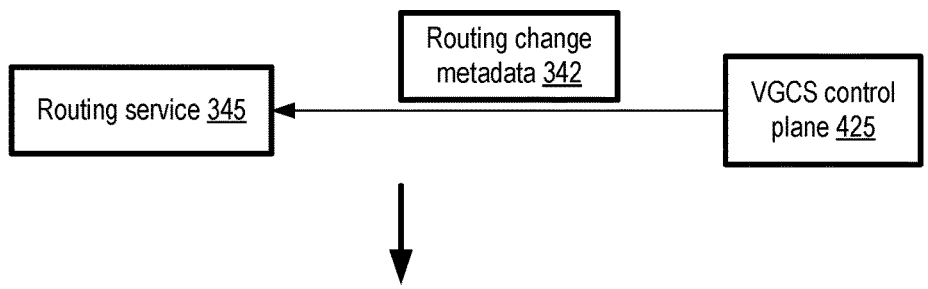
Figure 4:
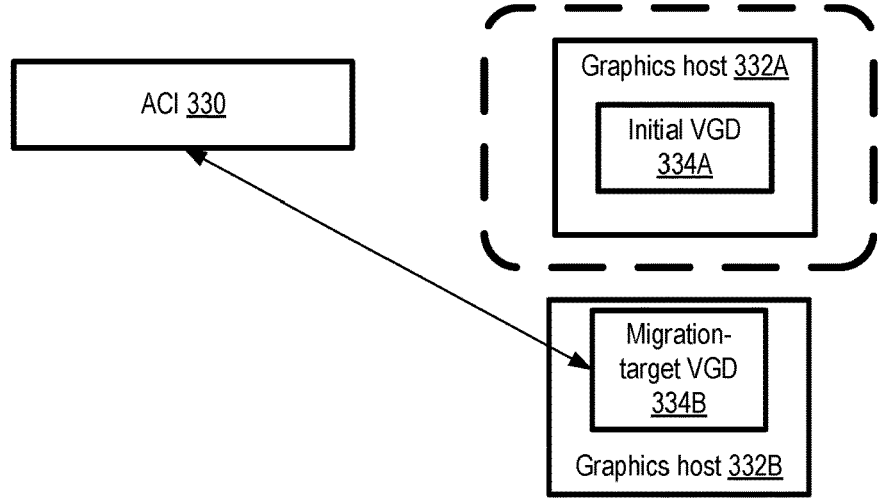

FIG. 3 and FIG. 4 collectively illustrate example operations which may be performed to implement a migrate-as-needed availability mode for virtualized graphics devices, according to at least some embodiments. In the depicted embodiment, the VGCS may support at least three availability modes 302 for remote virtualized graphics processing—migrate-as-needed mode 303A, mirrored mode 303B and hybrid mode 303C. A client 320 may submit a request 322 to attach a remote virtualized graphics device to a specified application compute instance in the migrate-as-needed mode (or, equivalently, submit a request for a new application compute instance with a remote virtualized graphics device pre-attached in migrate-as-needed mode). In some embodiments, the default availability mode for situations in which a client does not indicate a preference for any specific availability mode in the request may be the migrate-as-needed mode. The request may be received at the VGCS control plane 325.

The VGCS control plane may identify and provision resources which can be used to for the remote graphics operations of the application compute instance—e.g., a graphics host 332A with sufficient unused graphics processing capacity and/or other resources such as memory may be identified, and an initial virtualized graphics device (VGD) 334A may be instantiated at the host 332A for the application compute instance (ACI) 330, as indicated in the portion of FIG. 3 labeled "A. Initial setup". The appropriate configuration operations may be performed at a routing service or at various routing intermediary devices to enable graphics related traffic to flow between ACI 330 and the initial VGD 334A. Processing to obtain the results of graphics operations requested by ACI 30 may be performed at initial VGD 334A for some time in the depicted embodiment.

At some point in time after the initial setup was completed, an indication 327 of unavailability of the initial VGD 334A may be received or detected at the VCGS control plane 325 in the detected embodiment, e.g., with the help of one or more data sources 321 as shown in part B of FIG. 3. Such an indication may be received, for example, in advance of a planned maintenance operation pertaining to the VGD 334A, for which a notification may be provided to the VGCS control plane by a scheduled event management system. Alternatively, in at least some embodiments, the VGCS control plane may make a determination that the VGD 334A is (or is likely to be) in an impaired or unknown state, rather than a healthy state, on the basis of monitoring data collected from various agents or tools, as discussed below in further detail in the context of FIG. 8. Other data sources may be used to detect possible or actual unavailability of the initial VGD 334A in different embodiments.

In response to the indication of unavailability, a decision to migrate the processing of graphics requests of ACI 330 may be made at the VGCS control plane. A new set of resources may be identified and provisioned for a migration target VGD 334B in the depicted embodiment, e.g., at a different graphics host 332B than was used for the initial VGD 334A. The migration target VGD 334B may be instantiated, as shown in Migration step 1, in a network-isolated state in some embodiments—that is, initially, traffic flow between application compute instances and the migration target VGD may be disabled. The procedure for responding to the detection of unavailability may continue with operations shown in FIG. 4.

In a second step (Migration step 2) shown in FIG. 4, state information 341 which was stored at initial VGD 334A may be copied or transferred to the migration target VGD 334B. The initial VGD 334A may be briefly isolated with respect to network interactions with ACI 330, e.g., after some fraction of the state information has been transferred or copied. It is noted that at least in some embodiments, the copying of state information (which may include, for example, contents of various caches and devices) may be begun before the initial VGD is isolated, and that a large subset of the state information may be transferred before network isolation is required. To network isolate VGD 334A, in some embodiments the persistent connection established between the ACI 330 and the VGD 334A may be broken, or a directive may be sent by the VGCS control plane to the routing service indicating that packets should not be transmitted to VGD 334A. For a brief interval, the ACI may 330 not have connectivity with any VGD in such embodiments. During such an interval, in some embodiments, graphics request packets sent by the ACI 330 may in effect be dropped (which may potentially lead to resends of the packets by the ACI, depending on the details of the networking protocol being used). In other embodiments, at least some graphics request packets sent by the ACI 330 may be buffered during the network isolation phase, e.g., at intermediary routing devices and/or at one or more buffers established in the VGCS data plane for VGD migrations. In order to enable the copying of state information 341, network connectivity may have to be established between the VGDs 334A and 334B in the depicted embodiment, and the processing of graphics requests from the ACI 330 may have to be deferred until the completion of transfer of the state information 341. In some embodiments, e.g., in order to avoid/reduce delays in copying the state information, portions of the state information 341 may be saved periodically at storage devices separate from graphics host 332A during normal operation prior to the indication of unavailability. In such an embodiment, in some cases, if connectivity cannot be established sufficiently quickly between the VGDs 334A and 334B, the latest available state information that was saved at the storage devices may be copied to VGD 334B.

In a third step (Migration step 3), routing change metadata or mappings 342 may be sent to the routing service 345, to enable traffic to flow between the migration target VGD 334B and the application compute instance 330 in the depicted embodiment. After the configuration changes corresponding to the migration are applied, graphics request traffic may begin to flow from the ACI 330 to the migration target VGD 334B, and responses may flow back to the ACI 330 from VGD 334B, as shown in Migration step 4 of FIG. 4. In embodiments in which packets containing graphics requests were temporarily buffered, the buffered packets may be sent on to the migration target VGD 334B for processing, e.g., in the order in which they were buffered. It is noted that in some embodiments, packets containing the results of graphics processing may be transmitted (from both the initially-configured remote virtualized graphics device and the migration target) to a destination other than the ACI 330, such as a client device, and the appropriate routing directives or metadata changes may be initiated by the VGCS control plane to route the result packets.

Mirrored Availability Mode

Figure 5:
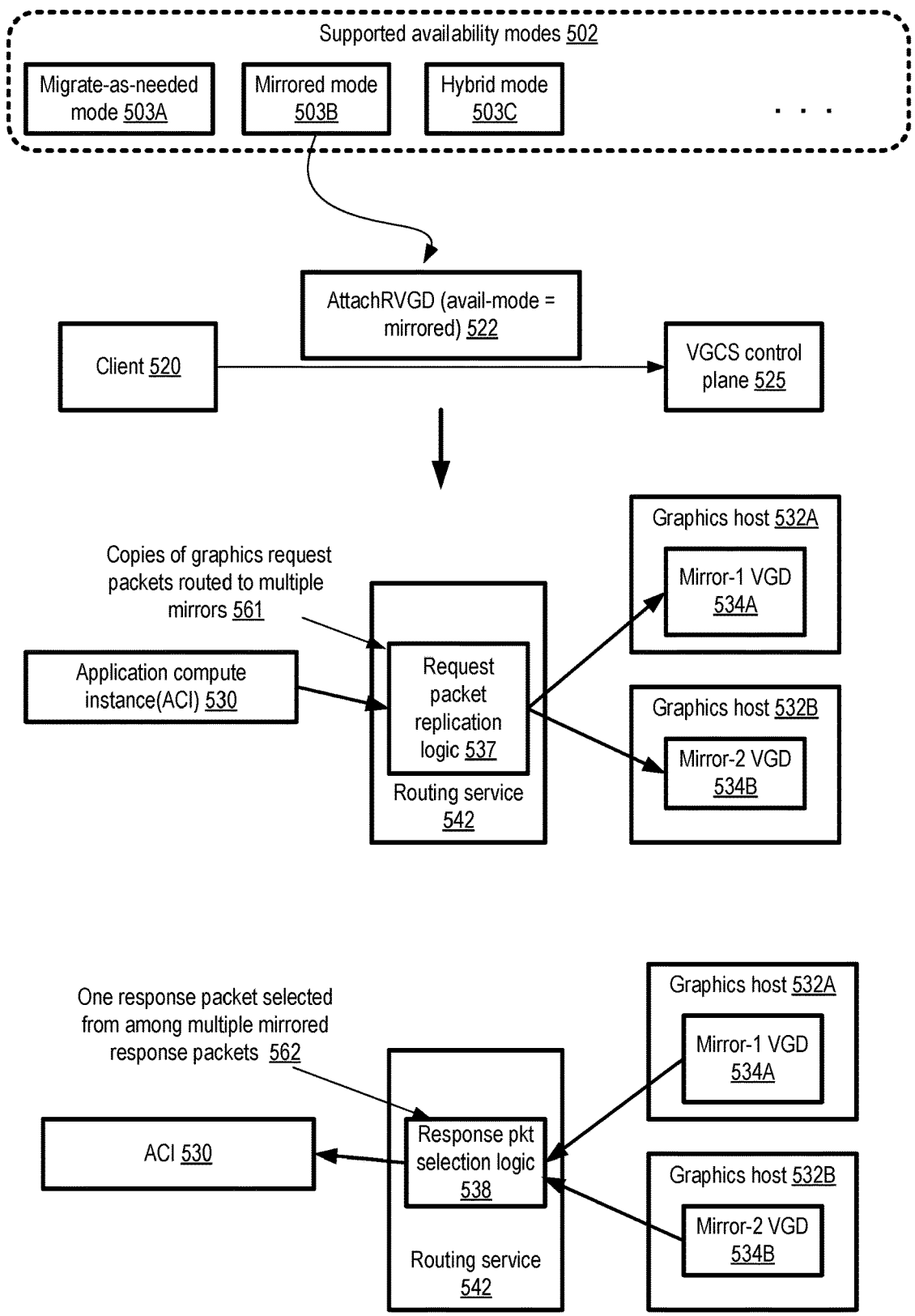
FIG. 5 illustrates example operations which may be performed to implement a mirrored availability mode for virtualized graphics devices, according to at least some embodiments.

FIG. 5 illustrates example operations which may be performed to implement a mirrored availability mode for virtualized graphics devices, according to at least some embodiments. A request 522 to configure or attach remote virtualized graphics devices in mirrored mode may be received at the VGCS control plane in the depicted embodiment. In response, a plurality of virtualized graphics devices such as Mirror-1 VGD 534A at graphics host 532A and Mirror-2 VGD 534B at graphics host 532B may be instantiated by the VGCS control plane.

Routing configuration metadata or mappings may be generated at the VGCS control plane to enable outbound packets generated at the application compute instance 530 to be replicated, such that a respective copy of each outbound packet is received at each of the mirrors 534A and 534B, as indicated by label 561. The request packet replication logic 537 of routing service 542 may receive the metadata from the VGCS control plane, generate the replicas of the packets, and transmit the packets to the mirrors. From the perspective of any given mirror 534, that mirror may be responsible for executing all the graphics operations requested by the ACI 530, and maintaining the application state information needed to do so, independently of any operations being performed at any other virtualized graphics device in the depicted embodiment. In at least some embodiments, a given mirror 534 may not even be notified or informed regarding the existence of any other mirrors. In effect, the same set of requested graphics operations may be replicated at each of the mirrors, and the same state information may be stored at each of the mirrors as the processing proceeds in the depicted embodiment.

In at least some embodiments in which the mirrored availability mode is being implemented, duplicate network packets containing results of the processing may be transmitted by each mirror 534 with the application compute instance 530 as the intended destination. Response packet selection logic 538 at the routing service which acts as an intermediary between the remote virtualized graphics devices and the application compute instance 530 may be responsible for, in effect, removing duplicates in the set of response packets transmitted on to the application compute instance 530. From among a set of response packets whose payloads contain results of the same graphics operations, in the depicted embodiment one packet may be selected at the routing service for transmission to the application compute instance 530. From the perspective of the application compute instance, a single stream of request packets may be sent and a single stream of corresponding response packets may be received in the depicted embodiment. As long as at least one of the mirrored VGDs 534 remains operational, graphics processing on behalf of the application compute instance may continue without interruption in the depicted embodiment. Any of a number of different schemes or policies may be used to implement the selection 562 of the particular packet from the multiple packets containing the results of a given graphic operation in different embodiments. As in the case of the migrate-as-needed mode, in some embodiments response-containing packets may be transmitted to a designated graphics result destination other than the application compute instance.

Figure 6:
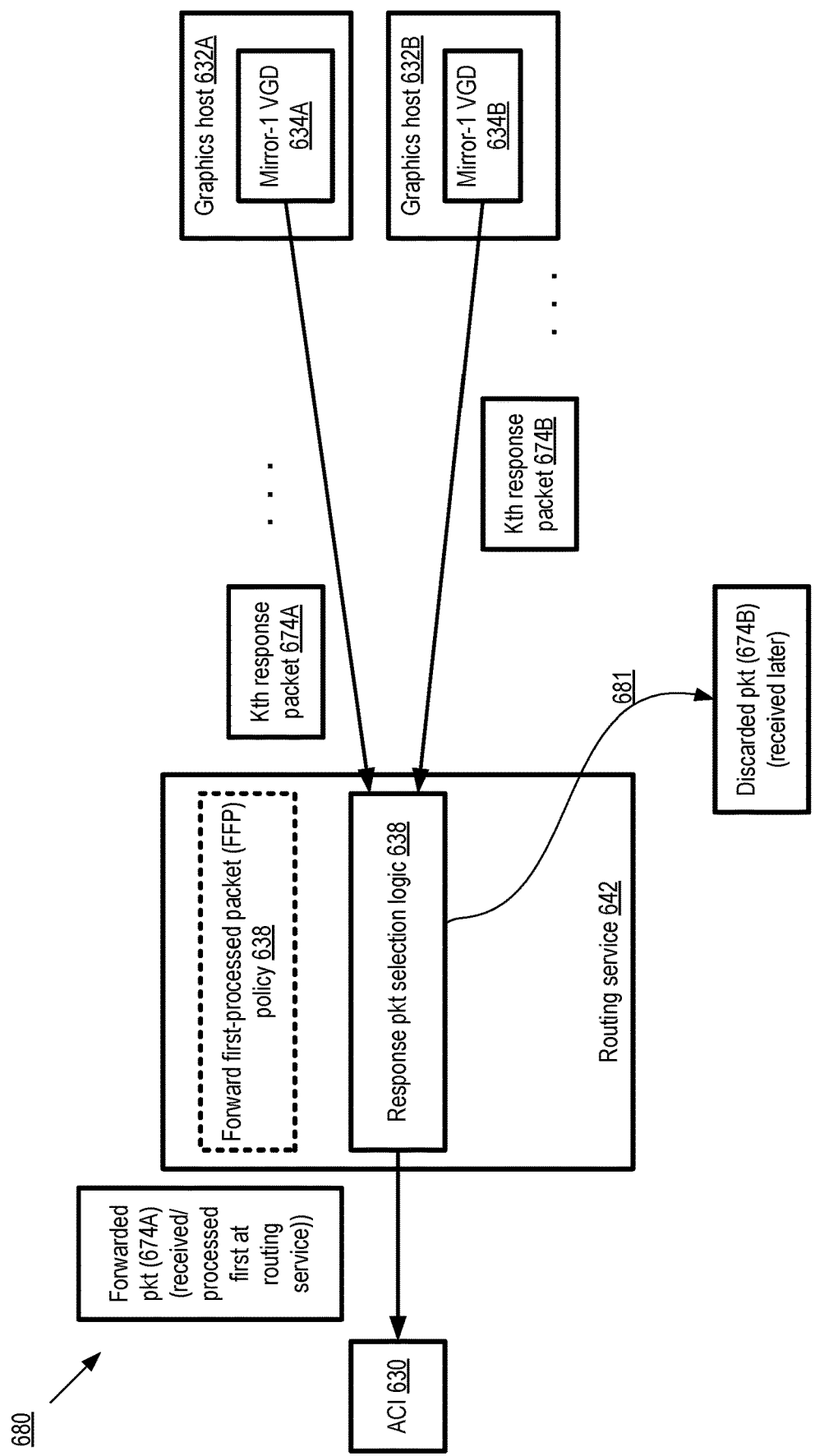
FIG. 6 illustrates an example policy for response packets which may be implemented when a mirrored availability mode is used for virtualized graphics devices, according to at least some embodiments.

FIG. 6 illustrates an example policy for response packets which may be implemented when a mirrored availability mode is used for virtualized graphics devices, according to at least some embodiments. In the depicted embodiment, a respective stream of packets containing results of duplicated executions of graphics operations performed at the mirrored VGDs such as VGD 634A (at graphics host 632A) and VGD 634B (at graphics host 632B) may be transmitted with the same requesting application compute instance 630 as the intended graphics result destination. Among any given pair of duplicated result packets, such as the copies 674A and 674B of the Kth response packet, one of the packets may be processed at the routing service 642 prior to the other.

According to the forward first-received packet (FFP) policy 638 being employed at the routing service in the depicted embodiment, the first of the duplicated packets that is processed at the routing service 642 may be transmitted to its intended destination as indicated by element 680, while the second packet may be dropped or discarded as indicated by arrow 681. If N mirrored virtualized graphics devices are configured, where N exceeds 2, the first-processed packet of the set may be transmitted to the application compute instance and the remaining (N−1) duplicated response packets may be discarded in some embodiments. Transmitting the first-processed response packet from among a set of duplicate response packets may have the additional advantage that regardless of the speed at which the responses are generated at the mirrors and/or the speed of transmission of the responses to the routing service, the fastest possible response may be provided to the application compute instance 630.

In at least one embodiment, policies other than the FFP policy illustrated in FIG. 5 may be supported for response packet handling. For example, in one embodiment, one of the mirrored VGDs 634 may be designated as a primary mirror, and response packets generated at the primary may be given a higher priority than response packets generated at a non-primary. In one such embodiment, if a response packet is received at the routing service 642 from a non-primary mirror, and a corresponding duplicate packet from the primary mirror is not received within a threshold time interval, the response packet from the non-primary may be sent to the application compute instance 630. As noted earlier, in one embodiment all the duplicate response packets received at the routing layer may be forwarded to the application compute instance 630, and a de-duplicator component at the application compute instance may be responsible for discarding duplicates. In various embodiments, directives, metadata and/or mappings to implement the desired response packet handling policy on behalf of a given application compute instance may be generated at the VGCS control plane (e.g., by a network configuration manager) and provided to the routing service.

As indicated earlier, in at least some embodiments, mirrored remote VGDs may be used to compare versions of software and/or hardware used for supporting virtualized graphics, in addition to or instead of being used to enhance availability. Consider an example scenario in which the functionality of two versions, V1 (a trusted or well-known version) and V2 (an experimental version), of hardware/software stacks providing virtualized graphics capabilities are to be compared. Such a scenario may arise, for example as a result of the introduction of new types of GPUs, new types of graphics hosts, new versions of one or more layers of firmware or software used for remote virtualized graphics, etc. A pair of mirrored remote VGDs may be set up in one embodiment: M1 representing V1 and M2 representing V2. As in the case of mirrored availability mode operations, an identical sequence of graphics requests may be sent to both mirrors. Response packets generated at each mirror may be transmitted to the requesting application compute instance in such an embodiment, where the duplicated response packets corresponding to a given requested graphics operation may be compared. The results of the comparison may be used to determine whether the experimental version V2 meets an acceptance criterion with respect to the trusted version— e.g., whether both versions provide the same or equivalent functionality. Bit-level comparisons may be performed in some embodiments with respect to at least some portions of the response packets' data, while higher-level semantic comparisons (which may involve aggregating contents of several successive response packets) may be performed in other embodiments.

Hybrid Availability Mode

Figure 7:
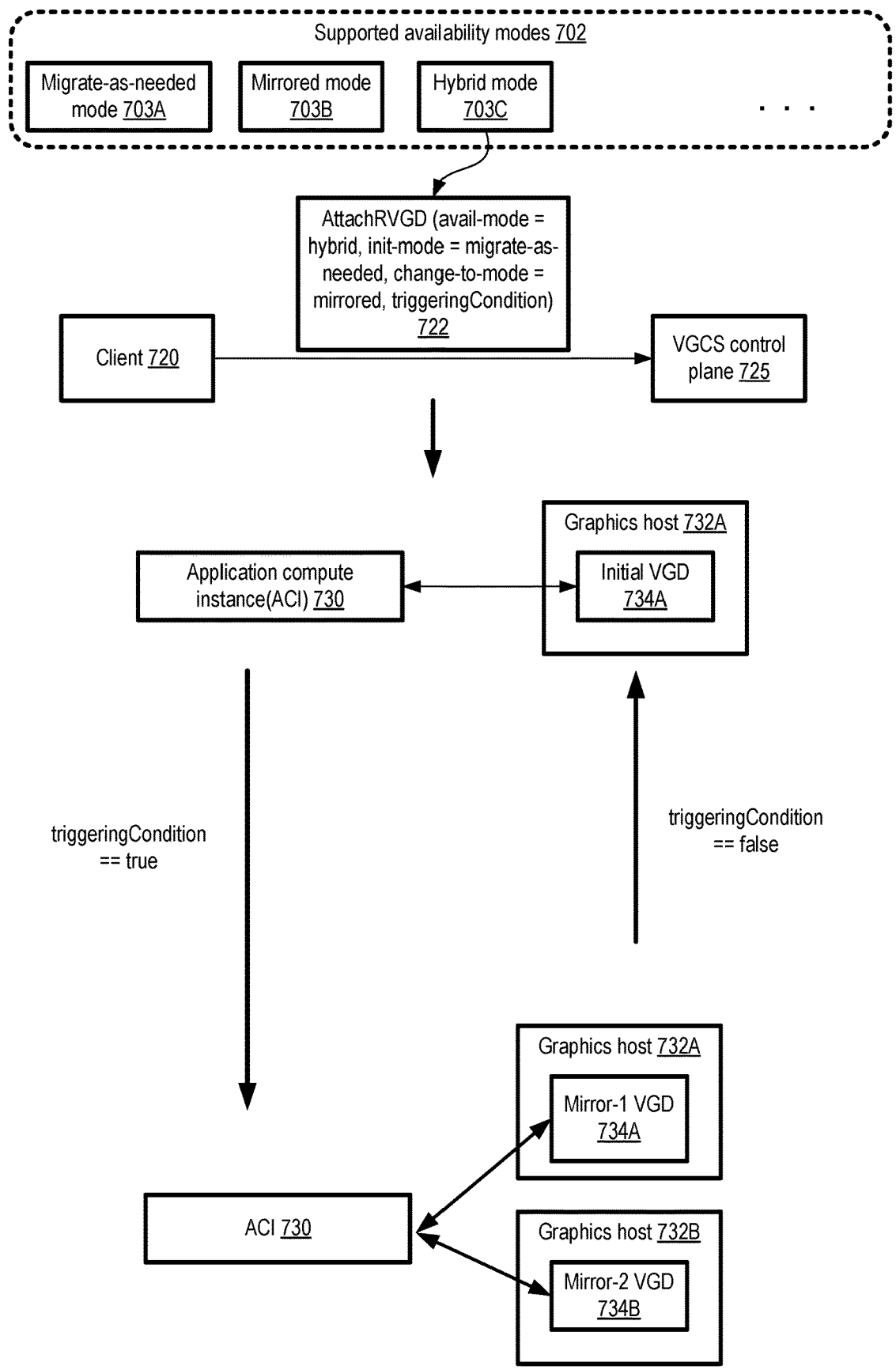
FIG. 7 illustrates a hybrid availability mode for virtualized graphics devices, according to at least some embodiments.

FIG. 7 illustrates a hybrid availability mode for virtualized graphics devices, according to at least some embodiments. In the depicted embodiment, a request 722 to attach one or more remote virtualized graphics devices to an application compute instance in the hybrid availability mode may be received at the VGCS control plane 725. The request 722 may indicate, for example, an initial availability mode (migrate-as-needed in the depicted scenario, as indicated by the value of the init-mode parameter), an alternative availability mode to which a transition is to be made (the mirrored mode in the depicted scenario as indicated by the value of the "change-to mode" parameter), and a triggering condition (corresponding to the value of the triggeringCondition parameter) which is to lead to the change in the availability mode in the depicted embodiment.

Based on the supplied parameters, the VGCS control plane may first instantiate an un-mirrored initial VGD 734A at a selected graphics host 732 and cause the configuration operations needed to enable graphics-related traffic to flow between the application compute instance 730 and the initial VGD 734A in the depicted embodiment. The VGCS control plane may then track various metrics pertaining to the triggering condition indicated in the request 722, or subscribe to notification data sources (such as scheduled event managers) which may publish information about the triggering condition. If and when the triggering condition is met (as indicated by the arrow labeled "triggeringCondition==true"), the change-to mode may be implemented, e.g., by adding a mirrored VGD 734B at a different graphics host 732B in the depicted embodiment, copying state information from the original VGD 734A (which may be designated as one of the mirrors), causing the appropriate configuration operations at routing intermediaries, and starting duplicate execution of requested graphics operations as discussed earlier with respect to the mirrored availability mode. In at least some embodiments, the reverse transition may be implemented if and when the triggering condition no longer holds—e.g., one of the mirrors may be discarded and the migrate-as-needed mode may be resumed. In one embodiment, a separate parameter indicating a triggering condition for the reverse transition may be indicated programmatically by the client 720, e.g., in the request 722.

In one embodiment, a client 720 may initially request one availability mode for their graphics processing operations, and then dynamically request a change to a different mode. For example, initially, migrate-as-needed mode may be requested, and the VGCS control plane may later be requested to change to mirrored mode. In effect, the second request in such an example scenario would correspond to the "triggeringCondition==true" transition shown in FIG. 7. In some embodiments, the mirrored availability mode may be set up initially, e.g., by instantiating a pair of remote virtualized graphics devices for operations requested from a given application compute instance, and the availability mode may be changed dynamically to the migrate-as-needed mode, e.g., by terminating the operation of one of the mirrors. A client may be allowed to switch back and forth between supported modes multiple times in some embodiments.

Monitoring Techniques for Virtualized Graphics Operations

In various embodiments, information about the state of the network connectivity between application compute instances and remote virtualized graphics devices may be collected using a variety of tools. In some embodiments, some of this information may be used to make decisions regarding the migration of graphics workloads as discussed earlier in the context of the discussion of the migrate-as-needed availability mode. In addition, in at least one embodiment the customers on whose behalf remote virtualized graphics processing is enabled may be provided insight (using, for example, graphical or web-based consoles or other programmatic interfaces) into the health states of at least some of the components involved such as the application compute instances, the remote virtualized graphics devices, and/or the network connections between the application compute instances and the remote virtualized graphics devices.

Figure 8:
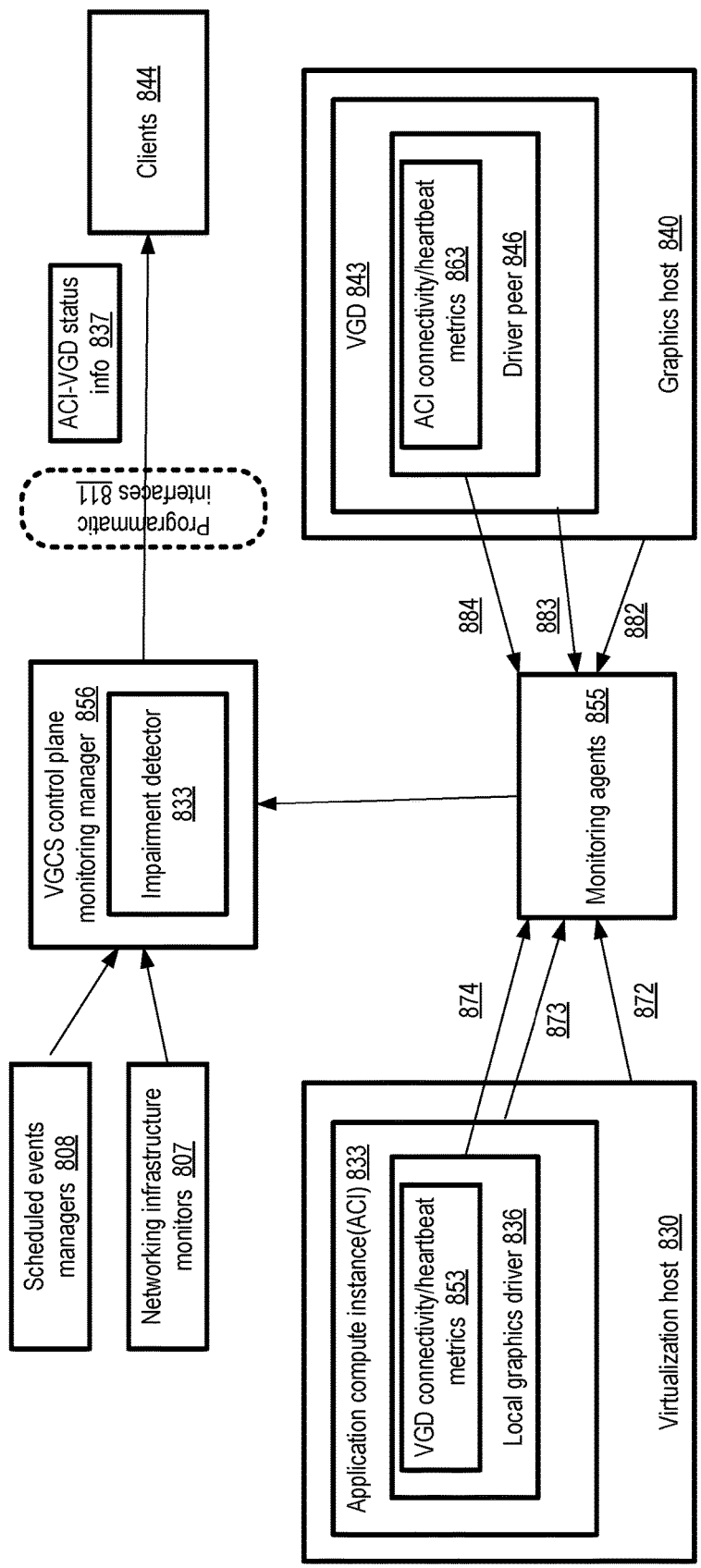
FIG. 8 illustrates example monitoring operations which may be performed in environments in which virtualized graphics devices are supported, according to at least some embodiments.

FIG. 8 illustrates example monitoring operations which may be performed in environments in which virtualized graphics devices are supported, according to at least some embodiments. In the depicted embodiment, a number of monitoring agents 855 may collect health state information regarding virtualization hosts 830 (as indicated by arrow 872), application compute instances 833 (as indicated by arrow 873), and the local graphics drivers 836 (as indicated by arrows 874), and report the metrics in raw or processed form to a VCS control plane monitoring manager 855. At least some of the agents 855 may, for example, exchange messages with the virtualization hosts, the application compute instances and/or the drivers to determine the responsiveness of those entities, to obtain measurements regarding resource utilizations and the like. Similarly, at least some agents 855 may also collect health state information from various graphics hosts 840 (as indicated by arrow 882), virtualized graphics devices 843 (as indicated by arrow 883) and the driver peers 846 (as indicated by arrow 884) which have connections established with the local graphics drivers on the application compute instances. The metrics and other health information gathered from the graphics resources may also be passed on to the VCS control plane monitoring manager 856. In at least one embodiment, the local graphics driver 836 of a given application compute instance 833 may periodically transmit heartbeat messages to the driver peer 846, and record the responses to those heartbeat messages as part of locally cached VGD connectivity/heartbeat metrics 853. The cached connectivity/heartbeat metrics 853 may be provided to the monitoring agents 855 and thence to the monitoring manager 856. Similarly, at the other end of the connection established for graphics-related traffic, the driver peer may also maintain its cached connectivity/heartbeat metrics 863 based on communications with the local graphics driver, and provide them to the monitoring agents 855 and/or the monitoring manager 856.

In one embodiment, in addition to the metrics collected from the components instantiated at the virtualization hosts and the graphics hosts, the monitoring manager 856 may also obtain health state information regarding the networking pathways, switches, intermediary routing devices and the like from network infrastructure monitors 807 as well as scheduled events managers 808. Scheduled events managers 808 may, for example, be responsible for generating notifications regarding planned maintenance events (which may result in corresponding planned outages), upgrades to hardware and software, and so on. In some embodiments, an impairment detector 833 of the monitoring manager 856 may analyze the various kinds of data collected regarding health states and events and use the results of the analysis to decide whether various components of the VGCS data plane are operating normally, are impaired or are in unknown or indeterminate state. Health status information 837 regarding application compute instances and their associated virtualized graphics devices, including for example results of the analysis which indicate the status of network connectivity between the ACIs and the VGDs, may be provided via programmatic interfaces 811 to VGCS clients 844 in the depicted embodiment. It is noted that health state information may be gathered from other entities within the VGCS than those shown in FIG. 8 in some embodiments, and that all the sources of health state information shown in FIG. 8 may not necessarily be utilized in at least one embodiment.

Methods for Supporting Availability Modes

Figure 9:
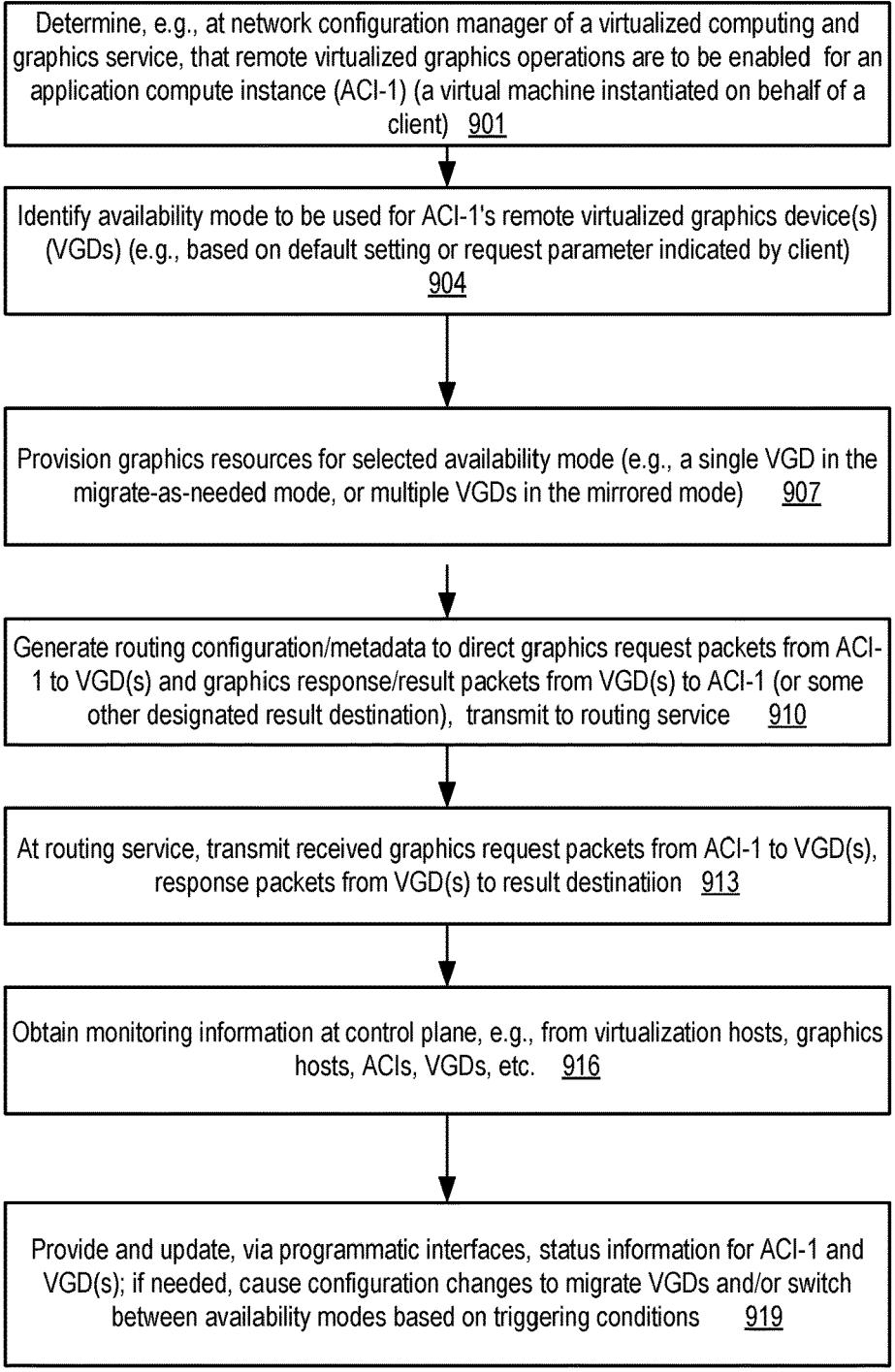
FIG. 9 is a flow diagram illustrating aspects of operations that may be performed to support a variety of availability modes for virtualized graphics devices, according to at least some embodiments.

FIG. 9 is a flow diagram illustrating aspects of operations that may be performed to support a variety of availability modes for virtualized graphics devices, according to at least some embodiments. As shown in element 901, a determination may be made that remote virtualized graphics processing is to be enabled for an application compute instance ACI-1 of a client of a virtualized graphics and computing service (VGCS). The application compute instance may comprise, for example, a virtual machine instantiated at a host, which would transmit graphics-related requests to one or more virtualized graphics devices over a network after the configuration operations needed to enable remote virtualized graphics processing are completed, and receive results of the requested graphics operations from the virtualized graphics devices over the network. In some embodiments, a different graphics result destination (such as a host at which a client program from which the request to enable remote virtualized graphics was received, or a proxy device which forwards results to a client program) other than the application compute instance may be designated for the remote virtualized graphics processing, e.g., as part of the request for enabling remote virtualized graphics operations. In some embodiments, the graphics result destinations to which packets containing the results of the remote graphics processing are to be directed may comprise the application compute instance from which the graphics requests are sent to the remote virtualized graphics device, and/or one or more other computing devices.

The VGCS may support several availability modes for remote virtualized graphics processing in the depicted embodiment. A particular availability mode may be selected for the client (element 904), e.g., based on default settings of the VGCS and/or based on a preference indicated by the client via a programmatic interface. In one embodiment, for example, a client may submit a request for virtualized graphics processing via a programmatic interface such as a web-based console, a command-line tool, an API, or a graphical user interface, with one or more parameters of the request indicating the availability mode desired. In some embodiments, availability modes may be changed after remote virtualized graphics capabilities are configured for an application compute instance—e.g., the VGCS may choose a default availability mode initially, and the client may later request a different availability mode programmatically.

The VGCS control plane may determine, based at least in part on the availability mode selected, the number and types of remote virtualized graphics devices that have to be set up, and provision the corresponding resources (element 907). For example, if the migrate-as-needed mode is selected, in one embodiment resources for a single virtualized graphics device may be provisioned at a graphics host with one or more GPUs. In contrast, if the mirrored availability mode is selected, resources may be provisioned in such an embodiment at several different graphics hosts comprising GPUs, e.g., with one mirrored virtualized graphics device at each of the graphics hosts. The number of mirrors may be determined by the VGCS based on preferences indicated by the client, or a default value may be selected. The appropriate number of virtualized graphics devices may be instantiated in various embodiments.

Routing metadata or mappings which can be used to direct network packets containing graphics requests from the application compute instance ACI-1 to the VGD(s), and the corresponding response packets from one or more of the VGDs back to ACI-1 and/or the designated graphics result destination, may be generated at the VGCS control plane in some embodiments (element 910), and transmitted to one or more components of a routing service. For example, in the migrate-as-desired mode, a mapping between a (source port, IP address) combination of a virtual network interface to be used for the request packets and a destination address of a VGD may be provided to the routing service in one implementation. In the mirrored mode, in some embodiments mappings which result in the N-way replication of request-containing packets, and transmission of individual replicated packets to each of N mirrors, may be generated and transmitted to the routing service. Similarly, configuration directives to select one response-containing packet from a set of replicated response-containing packets may be provided to the routing service (e.g., in accordance with the FFP policy discussed above) when mirrored availability mode is being used in at least one embodiment.

After the configuration operations to implement the traffic flow and routing for the selected availability mode have been applied, ACI-1 may begin transmitting graphics processing requests to the VGD(s) set up for it. One or more routers and/or other intermediary networking devices associated with the routing service may direct received request-containing packets from ACI-1 to the VGD(s), and the packets containing results of the remotely executed graphics processing operations from the VGD(s) to ACI-1 and/or other designated graphics result destination (element 913). Monitoring data pertaining to the health state of the various hosts (e.g., virtualization hosts being used for ACIs such as ACI-1, and graphics hosts being used for the VGDs), the virtualized devices themselves (e.g., ACI-1 And the VGDs), graphics drivers and driver peers, as well as the state of networking infrastructure components such as routing devices, switches, gateways and the like may be collected at the VGCS control plane in at least some embodiments (element 916) using techniques similar to those discussed above in the context of FIG. 8. Information about the status of ACI-1 and the VGDs associated with it may be provided via programmatic interfaces to the client on whose behalf the ACI-1 is established in some embodiments (element 919). Depending on the monitored information and the availability mode being used, operations such as migration of virtualized graphics workloads to a replacement virtualized graphics device and/or changes to routing metadata may be executed as needed in various embodiments.

Figure 10:
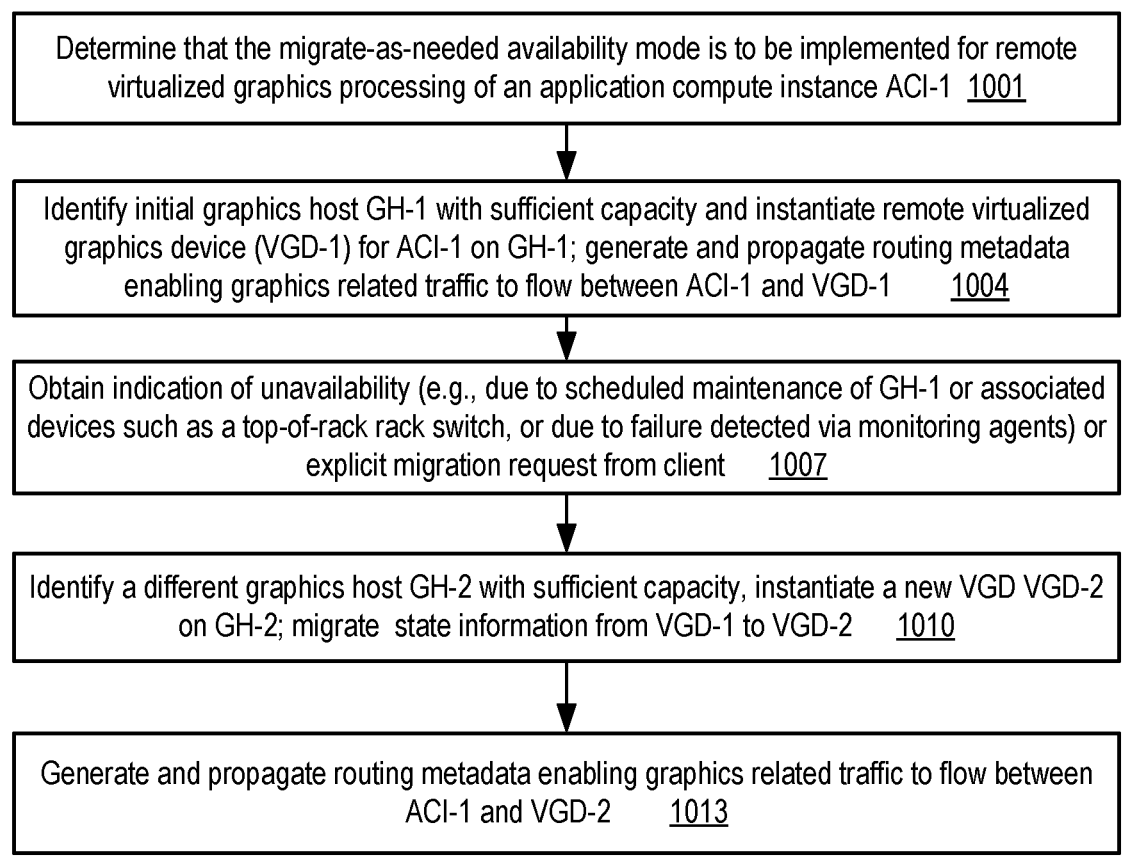
FIG. 10 is a flow diagram illustrating aspects of operations that may be performed to support a migrate-as-needed availability mode for virtualized graphics devices, according to at least some embodiments.

FIG. 10 is a flow diagram illustrating aspects of operations that may be performed to support a migrate-as-needed availability mode for virtualized graphics devices, according to at least some embodiments. As shown in element 1001, a determination may be made, for example at a control component such as a network configuration manager of a virtualized graphics and computing service (VGCS), that remote virtualized graphics processing in migrate-as-needed availability mode is to be configured for an application compute instance ACI-1 on behalf of a client. In some embodiments in which multiple types of virtualized graphics devices with different performance capabilities are supported, the specific type of virtualized graphics device and the availability mode in which it is to be configured may be indicated via parameters of a request received from a client via a programmatic interface. In other embodiments, the VGCS control plane may select the type of virtualized graphics device to be used, e.g., based on default settings.

An initial graphics host GH-1 with sufficient capacity for the selected type of virtualized graphics device may be identified, and a remote virtualized graphics device VGD-1 may be instantiated for ACI-1 on GH-1 in the depicted embodiment (element 1004). The VGCS control plane may generate and propagate, routing metadata or mappings enabling graphics related traffic to flow between ACI-1 and VGD-1, e.g., to a routing service and/or one or more routing intermediary devices.

The VGCS control plane may monitor the health status of data plane components such as the virtualized graphics devices, application compute instances and the like in various embodiments, and also register to receive notifications regarding scheduled events which may impact the availability of or access to the devices and/or instances. An indication of potential or actual unavailability of VGD-1 (e.g., due to scheduled maintenance of GH-1 or associated devices such as a top-of-rack rack switch, or due to a failure detected via monitoring) may be received at the VGCS, or an explicit migration request may be received from a client (element 1007). In some embodiments, one or more monitoring agents may provide the indication of unavailability to the VGCS control plane, while in other embodiments the VGCS control plane may analyze received monitoring data from one or more sources to determine whether the connectivity between VGD-1 and ACI-1 is compromised or is likely to be compromised. In some embodiments, a client of the VGCS may submit a programmatic request to migrate the graphics workload currently being processed at one remote VGD to another (e.g., a faster or more powerful) remote VGD, and the VGCS may perform the requested migration regardless of unavailability considerations. As part of the configuration changes implemented for the explicitly-requested migration of the workload, routing metadata may be generated and propagated to ensure that (a) packets containing requests for graphics operations are transmitted from the application compute instance to the VGD chosen as the destination for the migration and (b) packets containing the results of the migrated workload are directed to the appropriate destination from the VGD to which the workload was migrated.

In response to the indication of unavailability or the explicit migration request, in at least some embodiments a different graphics host GH-2 with sufficient capacity to execute the workload that was previously being handled at VGD-1 may be identified by the VGCS control plane. A new virtualized graphics device VGD-2 may be instantiated on GH-2, and the portion of application state information which was stored at VGD-1 and used to perform the requested graphics workload may be copied or migrated from VGD-1 to VGD-2 (element 1010). In some embodiments, application state information (such as the contents of various CPU and/or GPU caches, data structures stored in GH-1's main memory, etc.) may periodically be copied or check-pointed at a storage device separate from GH-1, so that the state information (as of the most recent checkpoint) can be copied to GH-2 even if GH-1 becomes unreachable.

The appropriate routing mappings/metadata may be generated at the VGCS control plane to enable graphics-related traffic to flow between ACI-1 and VGD-2—e.g., a mapping between an (IP address, port) combination of a virtual network interface associated with ACI-1 and a destination address associated with VGD-2 may be generated and transmitted to a routing service (element 1013). After the new routing metadata has been propagated and become effective, graphics-related requests generated at ACI-1 may be transmitted to VGD-2, and the results of the requested operations may be provided to ACI-1 from VGD-1 via the routing service in the depicted embodiment. In at least one implementation the time taken to copy the state information to the migration target VGD (e.g. VGD-2 in the scenario depicted in FIG. 10) and to apply the routing configuration changes may be short enough that the user experience of clients on whose behalf the graphics application is being run may be unaffected by the transition.

Figure 11:
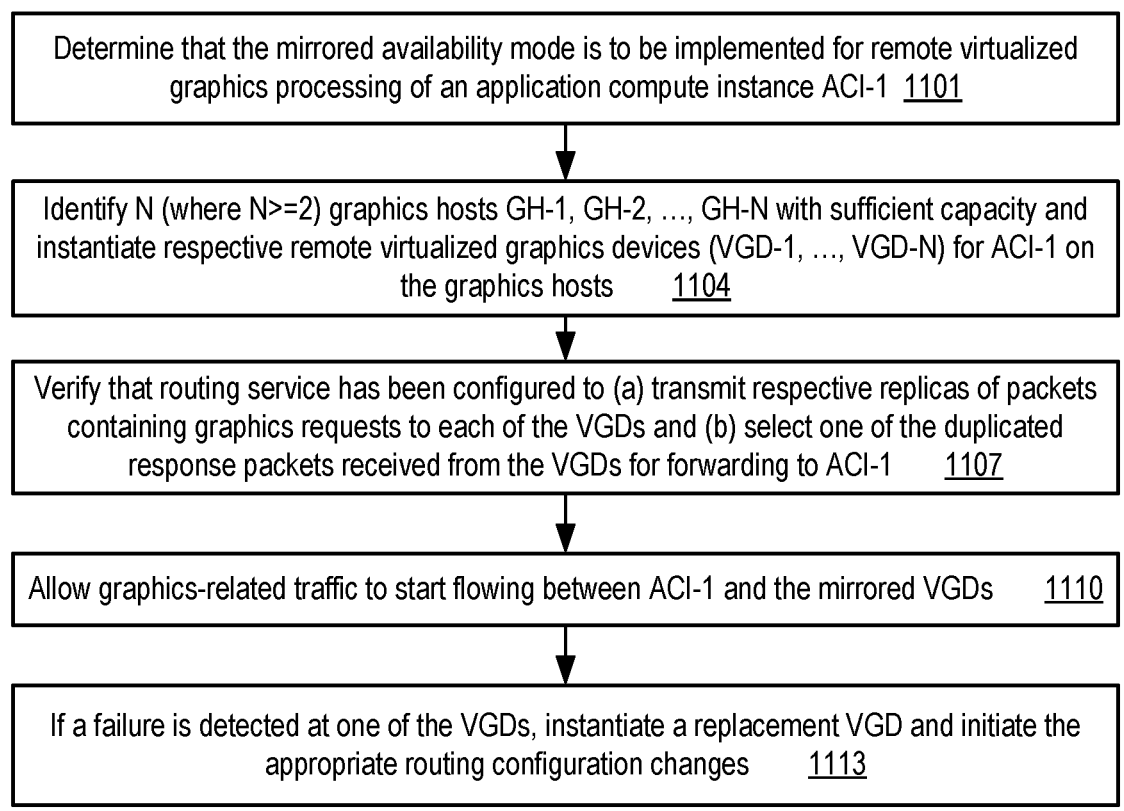
FIG. 11 is a flow diagram illustrating aspects of operations that may be performed to support a mirrored availability mode for virtualized graphics devices, according to at least some embodiments.

FIG. 11 is a flow diagram illustrating aspects of operations that may be performed to support a mirrored availability mode for virtualized graphics devices, according to at least some embodiments. As shown in element 1101, a determination may be made, for example at a control component such as a network configuration manager of a virtualized graphics and computing service (VGCS), that remote virtualized graphics processing in a mirrored availability mode is to be configured for an application compute instance ACI-1 on behalf of a client. In some embodiments, the specific type of virtualized graphics device and the availability mode in which it is to be configured (and in the case of mirrored mode, the number of mirrored virtualized graphics devices) to be configured may be indicated via parameters of a request received from a client via a programmatic interface. In other embodiments, the VGCS control plane may select the type of virtualized graphics device to be used, e.g., based on default settings, and/or the number of virtualized graphics devices to be set up as mirrors.

If mirrored availability mode with N (where N>=2) mirrors is to be implemented, initial graphics hosts GH-1, GH-2, . . . , GH-N with sufficient capacity may be identified by the VGCS control plane, and respective remote virtualized graphics devices (VGD-1, VGD-N) may be instantiated for ACI-1 on the graphics hosts (element 1104). The VGCS control plane may then generate the appropriate routing mappings/metadata for directing graphics requests from ACI-1 to the VGDs, and for directing at least one set of response packets back to ACI-1, and transmit the generated metadata/mappings to a routing service or a set of intermediary networking devices in the depicted embodiment. In at least one embodiment, the VGCS control plane may verify (e.g., based on acknowledgements received from the routing service indicating that the requested routing configuration operations have been completed) that the routing service has been configured to (a) transmit respective replicas of packets containing graphics requests to each of the N VGDs and (b) select one of the duplicated response packets received from the VGDs for forwarding to ACI-1 (element 1107).

After the configuration operations are completed, the VGCS control plane may allow graphics related traffic to flow between ACI-1 and each of the N mirrored VGDs in the depicted embodiment (element 1110). In response to a given request for graphics processing, the requested operations may be executed at each of the N mirrors, and from among a duplicated set of N packets containing a portion of the results of the operations, one result packet may be transmitted back to ACI-1 in some embodiments. As a result of the mirroring of operations at each of the N VGDs, the requested graphics operations may continue to be performed as long as at least one of the mirrors remains functioning and connected to ACI-1 in the depicted embodiment. State information of the application being executed may be automatically replicated at each of the mirrors, so copying of state information from one VGD to another may not be required. If and when one of the mirrors fails or becomes disconnected, a replacement VGD for that mirror may be configured and the appropriate routing configuration changes may be initiated (element 1113). Not all the mirrored VGDs may be configured on separate graphics hosts in some embodiments—e.g., multiple mirrors may be instantiated at a single graphics host in some cases. In at least one embodiment, a single availability mode (e.g., migrate-as-needed mode, or mirrored mode) may be supported at a VGCS for remote virtualized graphics operations.

It is noted that in various embodiments, some of the operations shown in FIG. 9, FIG. 10 or FIG. 11 may be implemented in a different order than that shown in the figure, or may be performed in parallel rather than sequentially. Additionally, some of the operations shown in FIG. 9, FIG. 10 or FIG. 11 may not be required in one or more implementations.

Use Cases

The techniques described above, of supporting a variety of availability modes for remote virtualized graphics processing, each potentially associated with a different billing rate, may be useful in a variety of scenarios. A wide variety of applications may be able to benefit from advanced graphics processing capabilities, such as applications in the domains of game streaming, rendering, financial modeling, engineering design, scientific visualization/simulation, and the like. Executing such applications on conventional CPUs may not be efficient, especially for large data sets. Using remote-attached virtualized graphics devices may be a more suitable approach for at least some such applications. However, for some such applications, at least a portion of application state information may be stored at the virtualized graphics devices during part of the execution, and losing the application state information (e.g., due to planned outages and/or due to failures) may be problematic. The availability requirements and associated budgets of the clients of a virtualized graphics processing service may vary, and allowing clients to choose from among multiple levels of availability may enable clients to make the desired tradeoffs between availability and cost.

Illustrative Computer System

Figure 12:
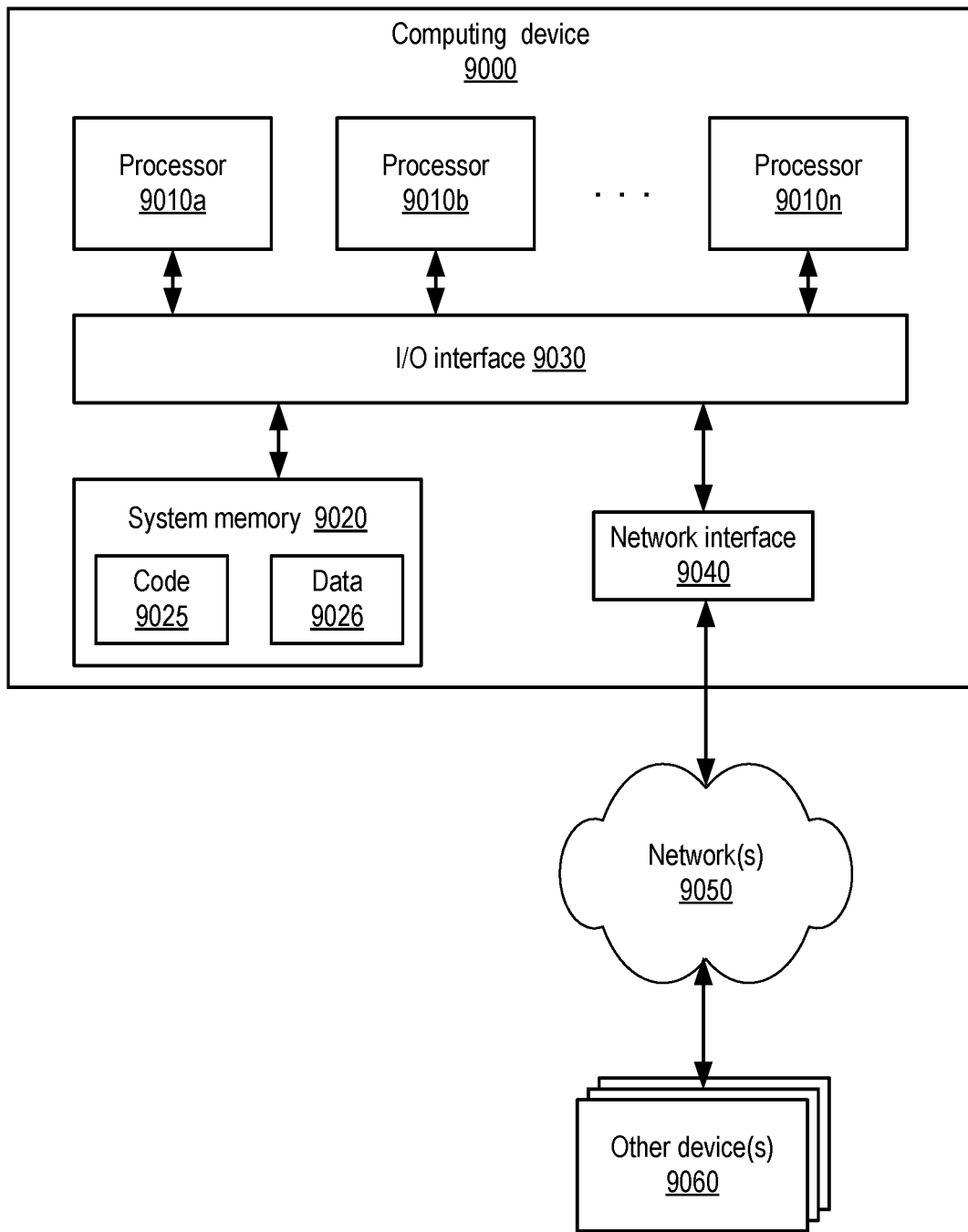
FIG. 12 is a block diagram illustrating an example computing device that may be used in at least some embodiments.

In at least some embodiments, a server that implements one or more of the techniques described above for managing traffic associated with virtualized graphics processing, including a network configuration manager, routers, and various other control plane and data plane entities of a virtualized graphics and computing service or a routing service, may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
 a network configuration manager executing on one or more computing devices of a provider network;
 wherein the network configuration manager includes instructions that upon execution on a processor cause the one or more computing devices to:
  in response to a determination that processing of remote virtualized graphics operations in a first availability mode of a plurality of availability modes on behalf of a first application compute instance on an application host is to be enabled:
   instantiate a first remote virtualized graphics device at a first host, wherein the first remote virtualized graphics device is configured to execute at least a portion of a graphics operation indicated by the first application compute instance; and
   cause a first configuration operation at one or more routing devices to enable a first packet from the first remote virtualized graphics device to be directed to the first application compute instance on the application host, wherein the first packet comprises a result of a first operation of a first graphics application executing on the first application compute instance on the application host, wherein the first operation is performed on behalf of the first application compute instance at the first remote virtualized graphics device; and
  subsequent to the instantiation of the first remote virtualized graphics device and to the first packet being directed from the first remote virtualized graphics device to the first application compute instance, and in response to an indication of unavailability of the previously instantiated first remote virtualized graphics device:
   cause state information of the first graphics application associated with performance of the first operation to be stored at a second remote virtualized graphics device at a second host; and
   cause a second configuration operation at the one or more routing devices to enable a second packet from the second remote virtualized graphics device to be directed to the first application compute instance on the application host, wherein the second packet comprises a result of a second operation of the first graphics application, wherein the second operation is performed at the second remote virtualized graphics device.

2. The system as recited in claim 1, wherein the network configuration manager includes instructions that upon execution on a processor cause the one or more computing devices to:
 determine that processing of remote virtualized graphics operations in a second availability mode of the plurality of availability modes on behalf of a second application compute instance is to be enabled;
 instantiate a plurality of remote virtualized graphics devices, comprising a third remote virtualized graphics device at a third host and a fourth remote virtualized graphics device at a fourth host, wherein, in response to a request for a particular graphics operation from the second application compute instance, (a) the third remote virtualized graphics device is configured to perform a first execution of the particular graphics operation and (b) the fourth remote virtualized graphics device is configured to perform a duplicate execution of the particular graphics operation; and
 cause one or more additional configuration operations at the one or more routing devices to enable, from among a plurality of packets, at least a particular packet to be directed to the second application compute instance, wherein the plurality of packets comprises (a) a third packet comprising a result of a first execution of a third graphics operation at the third remote virtualized graphics device operation and (b) a fourth packet comprising a result of a duplicated execution of the third graphics operation at the fourth remote virtualized graphics device.

3. The system as recited in claim 2, wherein the one or more additional configuration operations direct the one or more routing devices to discard at least one packet of the plurality of packets, without directing the at least one packet to the second application compute instance.

4. The system as recited in claim 1, wherein the network configuration manager includes instructions that upon execution on a processor cause the one or more computing devices to:

in response to determining that the availability mode with respect to processing of remote virtualized graphics operations on behalf of the first application compute instance is to be changed from the first availability mode to a second availability mode:
  instantiate a third remote virtualized graphics device; and
  cause an additional configuration operation to enable graphics-related packets to flow between the first application compute instance and the third remote virtualized graphics device.

5. The system as recited in claim 1, wherein the indication of unavailability comprises an indication of a planned outage.

6. A method, comprising:
performing, by on one or more computing devices:
  in response to determining that processing of remote virtualized graphics operations in a first availability mode on behalf of a first application compute instance on an application host is to be enabled:
    instantiating a first remote virtualized graphics device; and
    causing a first configuration operation at one or more routing devices to enable a first packet from the first remote virtualized graphics device to be directed to a first graphics result destination, wherein the first packet comprises a result of a first operation performed on behalf of the first application compute instance on the application host at the first remote virtualized graphics device; and
  subsequent to the instantiation of the first remote virtualized graphics device and to the first packet being directed from the first remote virtualized graphics device to the first application compute instance, and in response to an indication of unavailability of the previously instantiated first remote virtualized graphics device, causing a second configuration operation at the one or more routing devices to enable a second packet from a second remote virtualized graphics device to be directed to the first graphics result destination, wherein the second packet comprises a result of a second operation performed at the second remote virtualized graphics device on behalf of the first application compute instance on the application host.

7. The method as recited in claim 6, further comprising performing, by the one or more computing devices:
  causing at least a portion of state information of a first graphics application associated with the performance of the first operation to be stored at the second remote virtualized graphics device.

8. The method as recited in claim 6, wherein the first remote virtualized graphics device is instantiated at a first host, and wherein the second remote virtualized graphics device is instantiated at a second host.

9. The method as recited in claim 6, wherein the first application compute instance is instantiated at a first host, and wherein the first graphics result destination comprises a second host.

10. The method as recited in claim 6, wherein the indication of unavailability comprises an indication of a planned outage.

11. The method as recited in claim 6, further comprising performing, by the one or more computing devices:
  receiving the indication of unavailability from a monitoring agent.

12. The method as recited in claim 6, further comprising performing, by the one or more computing devices:
  transmitting, via a programmatic interface, a data set indicative of a status of network connectivity between the first application compute instance and one or more remote virtualized graphics devices.

13. The method as recited in claim 6, further comprising performing, by the one or more computing devices:
  determining that processing of remote virtualized graphics operations in a second availability mode on behalf of a second application compute instance is to be enabled, and responsive to the determination:
    instantiating a plurality of remote virtualized graphics devices, comprising a third remote virtualized graphics device and a fourth remote virtualized graphics device, wherein, in response to a request for a particular graphics operation from the second application compute instance, (a) the third remote virtualized graphics device is configured to perform a first execution of the particular graphics operation and (b) the fourth remote virtualized graphics device is configured to perform a duplicate execution of the particular graphics operation; and
    causing one or more additional configuration operations at the one or more routing devices to enable, from among a plurality of packets, at least a particular packet to be directed to a second graphics result destination, wherein the plurality of packets comprises (a) a third packet comprising a result of a first execution of a third graphics operation at the third remote virtualized graphics device operation and (b) a fourth packet comprising a result of a duplicated execution of the third graphics operation at the fourth remote virtualized graphics device.

14. The method as recited in claim 13, wherein the one or more additional configuration operations direct the one or more routing devices to discard at least one packet of the plurality of packets, without directing the at least one packet to the second graphics result destination.

15. The method as recited in claim 6, further comprising performing, by the one or more computing devices:
  in response to determining that the availability mode with respect to processing of remote virtualized graphics operations on behalf of the first application compute instance is to be changed from the first availability mode to a second availability mode,
    instantiating a third remote virtualized graphics device; and
    causing an additional configuration operation to enable graphics-related packets to flow between the first application compute instance and the third remote virtualized graphics device.

16. The method as recited in claim 6, further comprising performing, by the one or more computing devices:
  determining that a request to migrate at least a portion of a graphics workload of the first application compute instance from the second remote virtualized graphics device to a third remote virtualized graphics device has been submitted;
  in response to the request to migrate, causing a third configuration operation at one or more routing devices to enable a third packet from the third remote virtualized graphics device to be directed to the first graphics result destination, wherein the third packet comprises a result of a third operation corresponding to the migrated portion of the graphics workload.

17. The method as recited in claim 6, further comprising performing, by the one or more computing devices:
  instantiating a plurality of remote virtualized graphics devices, comprising a third remote virtualized graphics device and a fourth remote virtualized graphics device, wherein the third remote virtualized graphics device represents a first version of virtualized graphics processing capabilities, wherein the fourth virtualized graphics device represents a second version of virtualized graphics processing capabilities, and wherein, in response to a request for a particular graphics operation from a second application compute instance, (a) the third remote virtualized graphics device is configured to perform a first execution of the particular graphics operation and (b) the fourth remote virtualized graphics device is configured to perform a duplicate execution of the particular graphics operation; and
  causing one or more additional configuration operations at the one or more routing devices to enable a plurality of packets to be directed to a second graphics result destination, wherein the plurality of packets comprises (a) a third packet comprising a result of a first execution of a third graphics operation at the third remote virtualized graphics device operation and (b) a fourth packet comprising a result of a duplicated execution of the third graphics operation at the fourth remote virtualized graphics device, wherein the second graphics result destination is configured to compare the third packet with the fourth packet to determine whether the first version of virtualized graphics capabilities meets an acceptance criterion with respect to the second version.

18. A non-transitory computer-accessible storage medium storing program instructions that when executed on one or more processors cause the one or more processors to:
  determine that processing of remote virtualized graphics operations in a first availability mode on behalf of a first application compute instance on an application host is to be enabled, and responsive to the determination:
    instantiate a plurality of remote virtualized graphics devices, comprising a first remote virtualized graphics device and a second remote virtualized graphics device, wherein, in response to a request for a particular graphics operation from the first application compute instance on the application host, (a) the first remote virtualized graphics device is configured to perform a first execution of the particular graphics operation and (b) the second remote virtualized graphics device is configured to perform another execution of the particular graphics operation; and
    cause one or more configuration operations at one or more routing devices to enable, from among a plurality of packets, at least a particular packet to be directed to a first graphics result destination, wherein the plurality of packets comprises (a) a first packet comprising a result of a first execution of a first graphics operation at the first remote virtualized graphics device operation and (b) a second packet comprising a result of another execution of the first graphics operation at the second remote virtualized graphics device.

19. The non-transitory computer-accessible storage medium as recited in claim 18, wherein the one or more configuration operations direct the one or more routing devices to discard at least one packet of the plurality of packets, without directing the at least one packet to the first graphics result destination.

20. The non-transitory computer-accessible storage medium as recited in claim 18, wherein the first remote virtualized graphics device is instantiated at a first host, and the second remote virtualized graphics device is instantiated at a second host.

21. The non-transitory computer-accessible storage medium as recited in claim 18, wherein the instructions when executed on the one or more processors cause the one or more processors to:
  in response to determining that the availability mode with respect to processing of remote virtualized graphics operations on behalf of the first application compute instance is to be changed from the first availability mode to a second availability mode, terminate processing of graphics operations on behalf of the first application compute instance at the second remote virtualized graphics device.

22. The non-transitory computer-accessible storage medium as recited in claim 18, wherein the instructions when executed on the one or more processors cause the one or more processors to:
  in response to determining that processing of remote virtualized graphics operations in a second availability mode on behalf of a second application compute instance is to be enabled:
    instantiating a third remote virtualized graphics device; and
    causing an additional configuration operation at the one or more routing devices to enable a third packet from the third remote virtualized graphics device to be directed to a second graphics result destination, wherein the third packet comprises a result of a third graphics operation performed on behalf of the second application compute instance at the third remote virtualized graphics device; and
  in response to an indication of unavailability of the previously instantiated third remote virtualized graphics device, causing another configuration operation at the one or more routing devices to enable a fourth packet from a fourth remote virtualized graphics device to be directed to the second graphics result destination, wherein the fourth packet comprises a result of a fourth operation performed at the fourth remote virtualized graphics device.

* * * * *